(12) United States Patent
Hovsepian et al.

(10) Patent No.: US 11,526,665 B1
(45) Date of Patent: Dec. 13, 2022

(54) DETERMINATION OF ROOT CAUSES OF CUSTOMER RETURNS

(71) Applicant: Amazon Technologies, Inc., Seattle, WA (US)

(72) Inventors: Karen Hovsepian, Mercer Island, WA (US); Mingwei Shen, Shoreline, WA (US); Srikar Appalaraju, Kirkland, WA (US); Andrew Shanley, Seattle, WA (US); Vijay Patha, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 252 days.

(21) Appl. No.: 16/711,216

(22) Filed: Dec. 11, 2019

(51) Int. Cl.
| | |
|---|---|
| *G06F 40/216* | (2020.01) |
| *G06N 7/00* | (2006.01) |
| *G06N 5/04* | (2006.01) |
| *G06F 17/18* | (2006.01) |
| *G06N 20/00* | (2019.01) |
| *G06F 17/16* | (2006.01) |
| *G06F 40/284* | (2020.01) |

(52) U.S. Cl.
CPC ............ *G06F 40/216* (2020.01); *G06F 17/16* (2013.01); *G06F 17/18* (2013.01); *G06F 40/284* (2020.01); *G06N 5/04* (2013.01); *G06N 7/005* (2013.01); *G06N 20/00* (2019.01)

(58) Field of Classification Search
CPC ........ G06F 17/16; G06F 17/18; G06F 40/216; G06F 40/284; G06F 40/30; G06N 5/04; G06N 7/005; G06N 20/00
See application file for complete search history.

(56) References Cited

U.S. PATENT DOCUMENTS

| | | | | |
|---|---|---|---|---|
| 8,806,455 B1* | 8/2014 | Katz | ................... | G06F 40/30 |
| | | | | 382/176 |
| 9,787,838 B1* | 10/2017 | Lembersky | ......... | H04M 3/5191 |
| 2010/0057651 A1* | 3/2010 | Fung | ..................... | G06N 7/005 |
| | | | | 706/54 |
| 2012/0290525 A1* | 11/2012 | Malik | ..................... | G06N 7/005 |
| | | | | 706/52 |
| 2013/0325552 A1* | 12/2013 | Niazi | ..................... | G06F 16/31 |
| | | | | 705/7.32 |
| 2014/0280193 A1* | 9/2014 | Cronin | .................. | G06N 20/00 |
| | | | | 707/741 |
| 2017/0116557 A1* | 4/2017 | Apte | .................. | G06F 16/3344 |
| 2017/0367617 A1* | 12/2017 | Albanese | .......... | A61M 16/0051 |
| 2019/0156926 A1* | 5/2019 | Nichols | ................... | G06F 40/35 |

(Continued)

*Primary Examiner* — Eric Yen
(74) *Attorney, Agent, or Firm* — Klarquist Sparkman, LLP

(57) ABSTRACT

Root cause estimation for a data set corresponding to customer returns of a product may use a probabilistic model to associate customer-entered product return data with probability distributions relating to possible root causes for the returns. A particular application relates to applying a Bayesian network to customer-selected return reason codes and customer-entered return reason comments to estimate a probability distribution for root causes of a plurality of returns and uncertainties relating to the probability distribution estimation. A bag-of-n-grams can be used to enable the Bayesian network to process natural language portions of the customer-entered product return data. The output of the model and other data relating to the root cause estimation can be conveyed to a seller of the returned products via a user interface.

20 Claims, 13 Drawing Sheets

(56) References Cited

U.S. PATENT DOCUMENTS

| | | | |
|---|---|---|---|
| 2020/0118014 A1* | 4/2020 | Kasturi | G06N 7/005 |
| 2020/0293594 A1* | 9/2020 | Raissi | G06N 20/00 |
| 2021/0327584 A1* | 10/2021 | Vakulin | A61B 5/0816 |

* cited by examiner

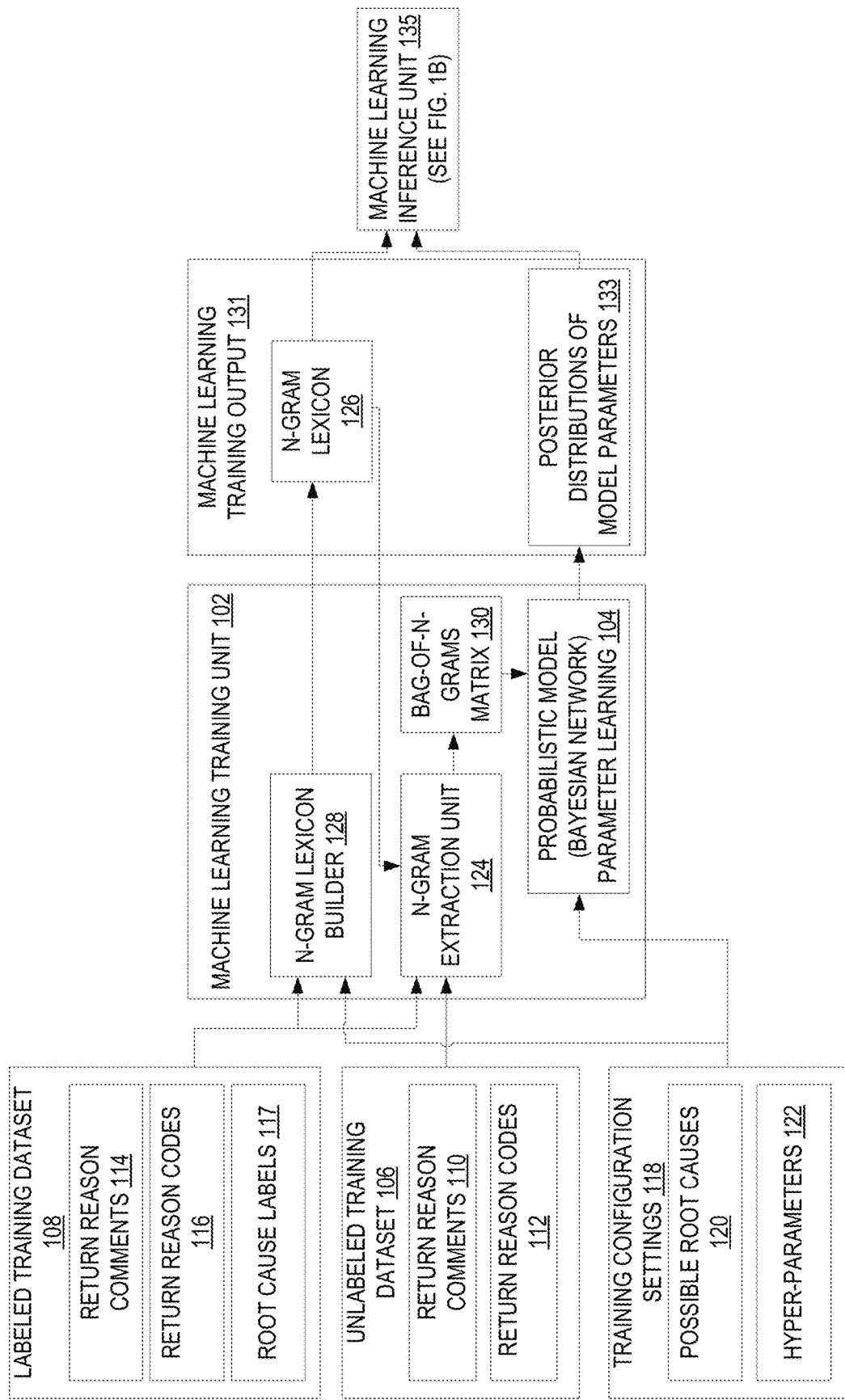

| True Root Cause label | COMPATIBILITY | CUSTOMER MISUNDERSTANDING | ITEMS/PARTS MISSING | MISLEADING DETAIL PAGE | NO LONGER WANTED/NEEDED | ORDERED BY MISTAKE | POOR QUAL OR DEFECT | PRODUCT DAMAGED | RECEIVED WRONG ITEM | SIZING/FIT/STYLE ISSUES |
|---|---|---|---|---|---|---|---|---|---|---|
| COMPATIBILITY | 120 |  | 1 | 1 | 1 | 21 | 32 | 1 | 5 |  |
| CUSTOMER MISUNDERSTANDING | 2 | 2 |  | 1 |  | 3 | 2 |  | 1 |  |
| ITEMS/PARTS MISSING |  |  | 13 | 1 |  |  | 5 | 1 |  |  |
| MISLEADING DETAIL PAGE | 7 |  |  | 14 |  | 1 | 12 |  | 1 |  |
| NO LONGER WANTED/NEEDED | 3 |  |  |  | 7 | 1 | 2 |  |  |  |
| ORDERED BY MISTAKE | 6 |  |  | 1 |  | 59 | 1 |  | 1 |  |
| POOR QUAL OR DEFECT | 15 |  | 1 | 2 | 1 | 2 | 465 | 11 | 1 |  |
| PRODUCT DAMAGED |  |  | 1 |  |  |  | 10 | 38 |  |  |
| RECEIVED WRONG ITEM | 4 |  |  |  |  | 6 | 3 | 1 | 23 |  |
| SIZING/FIT/STYLE ISSUES | 3 |  |  |  |  | 1 | 4 |  |  | 4 |

Predicted Root Cause label

DETERMINATION OF ROOT CAUSES OF CUSTOMER RETURNS

BACKGROUND

An issue that third-party sellers often encounter are product returns. Returns that are attributed to seller fault can have several negative consequences affecting their business. For example, such returns may be classified as negative customer experience (NCX) and contribute to reduced seller rating. Not only can the reduced rating affect future purchases but if the count of NCX returns passes a certain threshold, the seller/standard identification number combination associated with the returns may be frozen until the seller has demonstrated steps to fix the underlying cause of the NCX returns.

BRIEF DESCRIPTION OF THE DRAWINGS

FIGS. 1A and 1B are example block diagrams showing a system including a probabilistic model for estimating root causes of customer returns and conveying information relating to the estimations via a user interface.

FIG. 6 is a graphical representation of an example mapping of true root cause labels to estimated root cause labels generated by a probabilistic model.

DETAILED DESCRIPTION

Figure 1B:
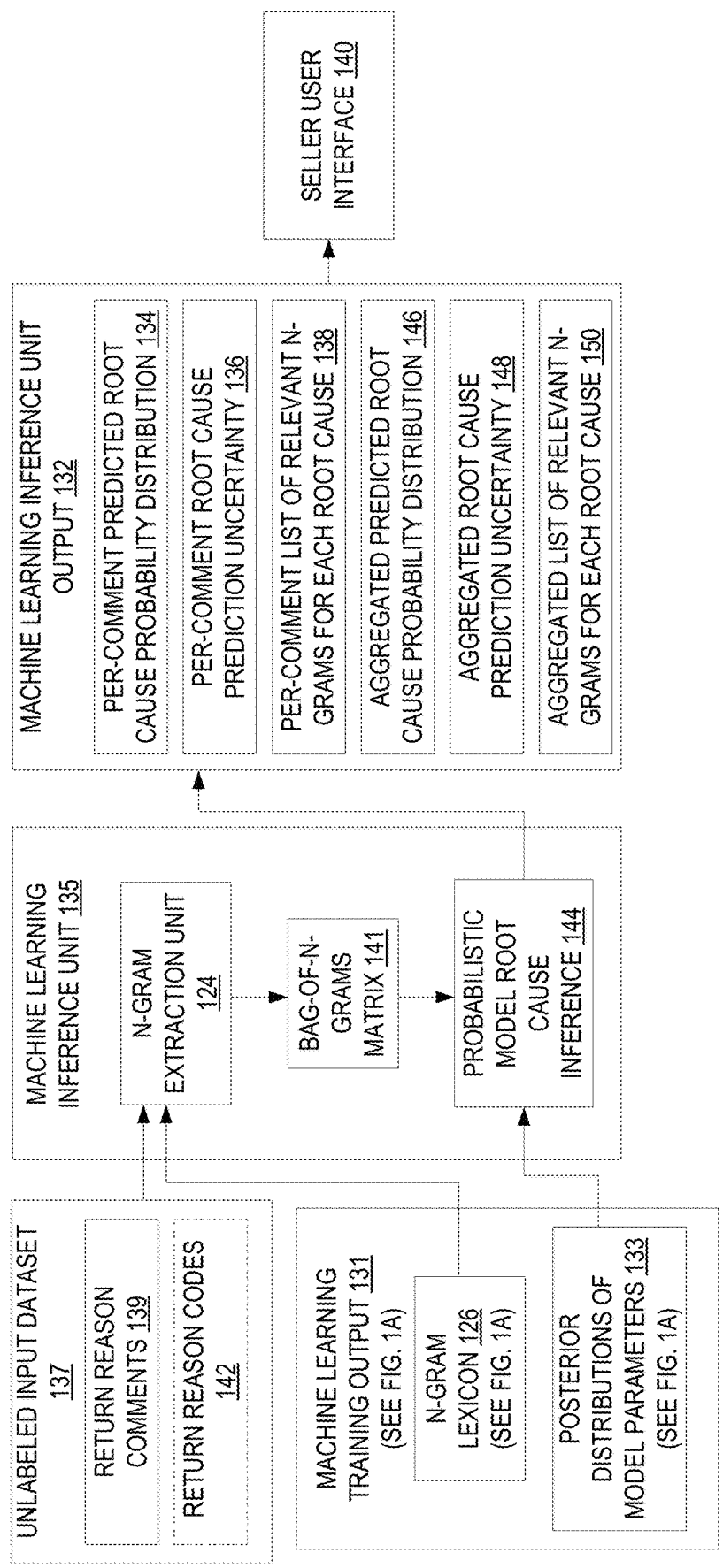

Approaches to identify product return reasons may rely on customer entry of return reason information, such as return reason codes that are associated with particular classes of returns and free-text comments. As the information from the customer regarding the return may be used by a service to determine customer experiences associated with a particular seller, vendor, and/or inventory owner, an indication of the return reason information may be provided to the seller/vendor/inventory owner via a user interface, such as a dashboard that provides a consolidated location to view customer return feedback. In this way, the seller, vendor, and/or inventory owner may observe trends in customer-entered return information in order to identify and/or resolve on-going issues with associated inventory. However, as described in more detail below, the customer-entered return information may be inaccurate, and a true root cause of the return may not be accurately reported from initial processing of the customer-entered information. The disclosure provides methods and systems for applying a machine learning model to customer-entered data to estimate root causes associated with returns, conveying information indicating the resulting estimations, and conveying information that explains the reasoning behind the resulting estimations in a user-friendly manner (e.g., in a manner that is interpretable by users who are not familiar with machine learning processes).

In reference to return processes for products, return reason codes may be selected by the customer from a predetermined list of possible codes (e.g., via a dropdown list during the return process). Some of the return reason codes may be used by a service to attribute the cause of the return to the seller (e.g., where the return is designated to be due to a fault on the part of the seller, such as a non-working product, an incorrectly advertised product, etc.), while other return reason codes may be used by a service to attribute the return to a non-seller cause (e.g., where the return is designated to be due to a fault on the part of the customer or a neutral circumstance, such as an unintentional order by the customer, a customer misunderstanding, etc.).

Accordingly, whether or not a particular return is associated with a seller fault may be based on the customer code entry, which opens up the possibility of abuse (e.g., deliberate entry of inaccurate reason codes) and/or errors (e.g., accidental entry of inaccurate reason codes). This possibility is increased in cases where some reason codes affect the customer financially. For example, the customer may select a return reason that indicates a fault of the seller in order to avoid paying for return shipping for the product.

Another component of return reason information may include a free-form/free-text customer comment, in which the customer may provide a reason for the return in his/her own words. However, there may be disparities between return reason codes selected by customers and the corresponding free-text comments. As noted above, this may be due to the customer attempting to game the system so that a refund or other financial incentive may be realized, or this may be due to the customer having difficulties in finding the right reason among the pre-determined return reason code list or accidentally selecting the wrong code from the list (e.g., from a dropdown list). It has been observed that sometimes customers who select an inaccurate (e.g., wrong or false) return reason code may truthfully provide the actual reason behind the return in a comment field. In one observation, in which an investigator attempted to label free-text comments from customers with appropriate return reason codes, the customer-selected return reason codes had only a 60% accuracy.

The generally noisy nature of the customer selected return reason codes results in confusing signals provided back to the sellers. There is abundantly reported anecdotal evidence of high levels of frustration experienced by the sellers due to the mismatch between the reported reason codes and the in-depth analysis of the comment themselves. As an example, consider the following two relatively typical examples: 1) Reason code: "Defective," Comment: "It doesn't really work like I thought it would. I guess it is not defective, I just misunderstood what it was. Sorry;" 2) Reason Code: "Missing Parts," Comment: "The screen protector had a crack in it."

Accordingly, if the comments are not used when evaluating an assignment of fault for the return, the fairness of the treatment of sellers may be affected. However, in some approaches, the processing of free-form comments may utilize complex natural language processing (NLP) algorithms and significant processing resources.

The present disclosure provides for a machine learning (ML) model that leverages both signals—reason code and comment—to infer the true underlying root cause of the return. As in any NLP task, there are major challenges in building a model capable of capturing non-trivial language use patterns associated with such high-level abstract notions as product return root cause. While possessing a large corpus of ground-truth labeled returns would allow for the learning of deep language models, the generally unlabeled nature of the data in the example environments described herein makes learning such models less straight-forward. Therefore, in one example, the disclosure provides a latent variable Bayesian network model that can be trained in a semi-supervised regime using a large corpus of unlabeled returns (e.g., consisting only of return reason codes and comments) and a much smaller set of labeled returns annotated with ground-truth root cause labels (e.g., based on manual evaluation of the comments and return reason codes in the smaller set).

Furthermore, as one aim is to build a seller/vendor/inventory owner-facing model, it is helpful to estimate the uncertainty of model predictions, in order to avoid unprincipled decisions and minimize user friction. Utilizing Bayesian inference of model parameters is an elegant method of attaining not only estimates of uncertainty of inferred parameters but even estimating uncertainty of observation-specific model predictions. To make up for the disclosed model's shallow NLP processing, a bag-of-n-grams processing pipeline is carefully configured to be capable of efficiently producing weighted term-frequency matrices for all n-grams (e.g., segments of entered text, such as phrases having a word length of up to "n"), with n=1 . . . 4, avoiding counting occurrences of subgrams contained in longer n-grams.

In the near-term, the impact of the model is that it can help improve fidelity of negative customer experience (NCX) counts, build seller trust, and help sellers understand why their products are actually being returned due to an increased accuracy and transparency in return reason estimation (e.g., relative to other approaches and/or approaches that rely only on customer-entered return reason codes).

In a longer-term, the model can help drive a solution that helps sellers reduce return rates by following Guided Defect Resolution (GDR) paths and addressing the underlying defects causing the returns. This, in turn, increases fairness of business practices and regulations and enables sellers to maximize revenue and minimize costs based on the high fidelity signals and inputs provided by the described methods and systems.

Through empirical validation, it can be shown that even with a shallow language model, based on a bag-of-n-grams observables, the disclosed systems and methods are able to achieve at least 80% accuracy on a test set of data (e.g., customer-selected return codes and comments). The ML-based approach described herein was not just able to achieve better accuracy, but also explain (i) which customer comments, and (ii) which words, or groups of words, in the customer comments, had higher contribution to the predicted reason. This enables systems to move away from black box predictions, and to provide explanations of the predicted root causes to intended users (e.g., 3rd party sellers and vendors). These explanations help these users (typically less familiar with statistics and machine learning) to understand why these predictions were made, and increase their confidence and trust in the system. The disclosure also describes new user experience that intuitively conveys these explanations without having to explain the ML model behind them to the users (e.g., laypersons without statistics/ML background). The described model may further provide a solid foundation for additional structure and complexity, thereby increasing adaptability and expandability of the disclosed methods and systems.

FIGS. 1A and 1B show an example block diagram of a system 100 for processing a customer-entered returns data set to estimate root causes for customer returns of products. The system 100 includes machine learning components, and the training portion of a processing pipeline associated with the system is described below with respect to FIG. 1A, while the application of the trained machine learning components in the processing pipeline is described below with respect to FIG. 1B.

As shown in FIG. 1A, the system 100 includes a machine learning training unit 102, which, in one example, is used to train a probabilistic model via probabilistic model parameter learning unit 104. In some examples, the probabilistic model is applied to input returns datasets to provide the above-described estimation of root causes (as will be described in more detail with respect to FIG. 1B below). Although represented as a single unit for illustrative purposes, it is to be understood that, in some examples, the machine learning training unit 102 and/or any of the components shown in FIGS. 1A and/or 1B are at least partially distributed among multiple computing devices, processing cores, storage devices, and/or other computing resources. In some examples, the operations of the machine learning training unit 102 and/or other units of the system 100 are performed using a cloud computing network or other computing arrangement as described in more detail below with respect to FIG. 11.

In some embodiments, the machine learning training unit 102 includes one or more processors and/or one or more storage devices storing instructions executable by the one or more processors to perform one or more of the operations disclosed herein. In one example, machine learning operations performed by the machine learning training unit 102 include operations for training a model, neural network, artificial intelligence, and/or other machine learning component in a supervised, partially-supervised, or unsupervised manner using input training data. After training the machine learning model(s), the system 100 makes predictions or estimations based on applying the learned model(s) (e.g., without being specifically programmed to make the predictions) to additional data received as input (e.g., as described below with respect to an machine learning inference unit shown in FIG. 1B). In some examples, the machine learning training unit 102 uses the additional data to continue training the model(s) during general processing, such that the unit is continuously learning and adapting.

In one example, the probabilistic model associated with the probabilistic model parameter learning unit 104 includes a Bayesian network, an example of which is illustrated and described in more detail below with respect to FIG. 2. Generally, a Bayesian network is a probabilistic model that represents a set of variables and their conditional dependencies. Applying the Bayesian network to the product returns example of the present disclosure, the probabilistic model is, in some embodiments, configured to represent probabilistic relationships between customer-input data regarding returns and root causes of the returns.

In order to train the probabilistic model by applying the probabilistic model parameter learning unit 104, the machine learning training unit 102 receives unlabeled input from unlabeled training dataset 106 and/or labeled input from labeled training dataset 108. Examples where only unlabeled input is used for training the model corresponds to unsupervised training, while examples where only labeled input is used for training the model corresponds to supervised training. In one example of the present disclosure, the model is trained in a partially-supervised manner, using unlabeled and labeled input.

The unlabeled training dataset 106 includes customer return reason comments 110 and/or customer return reason codes 112. As used herein, unlabeled refers to the lack of manual analysis of the customer-entered data to associate root causes for respective returns. The labeled training dataset 108 includes customer return reason comments 114 and/or customer return reason codes 116, which are respectively associated with root cause labels 117. As used herein, labeled refers to an annotation or other indication of a manual analysis of the customer-entered data, which associates root causes for respective returns based on a human evaluator's manual review of the customer return reason codes and/or comments. In one example, a customer enters a return reason comment, a return reason code, and/or a return reason comment/code pair for a given return represented by the training dataset, and after manual evaluation of the customer-entered data, a human evaluator associates a root cause label with the customer-entered data. Accordingly, each root cause label 117 is, in some examples, mapped to an associated return reason comment 114, return reason code 116, and/or return reason comment/code pair. In some embodiments, the training dataset(s) 106 and/or 108 are stored and/or transmitted from one or more computing devices in communication with a customer computing device that is used to enter the return reason codes 112/116 and/or the return reason comments 110/114.

As described above, return reason codes relate to predefined return reasons, which are selected by a customer from a list or otherwise input by the customer, while return reason comments include free-text and/or otherwise more unstructured comments in which a customer describes a reason for the return in his/her own words (e.g., up to a word/character limit). As further described above, in some scenarios, a customer-entered comment is indicative of a different return reason than an associated customer-selected return reason code. Accordingly, the unlabeled and labeled input are provided to the machine learning analysis unit 102 to enable the system 100 to estimate a root cause of a given return, considering the customer-selected return reason code and/or the customer-entered return reason comment.

The machine learning analysis unit 102 also receives machine learning parameters such as training configuration settings 118, which include a list of possible root causes 120 that are attributable to returns and one or more hyper-parameters 122 that are useable to configure the probabilistic model training unit 102 to increase accuracy. Example hyper-parameters include criteria that control which n-grams should be included in an n-gram lexicon, training parameters for the probabilistic model, etc. Further example hyper-parameters are described in more detail below with respect to FIG. 2.

As described above, a challenge relating to the type of input data provided to the probabilistic model is that the customer return reason comments are received as natural language input. In order to be evaluated for attributing root causes, the customer return reason comments are, in some embodiments, initially processed to generate data that is usable by the model.

In some examples, the comments are parsed into n-grams (e.g., phrases or snippets of the comments comprising up to n units/words) using n-gram extraction unit 124. However, as the processing of all n-grams of the comments may be computationally intensive, a machine learning output 131 may include an n-gram dictionary or lexicon 126, which is established in some embodiments to reduce the number of n-grams extracted from the comments for processing by the model. In order to build the n-gram lexicon, an n-gram lexicon builder logic 128 is applied (e.g., to a subset of the input training data) to determine which n-grams of the comments meet predefined criteria for inclusion in the lexicon. Examples of the criteria used to build the lexicon are described in more detail below with respect to FIG. 5A.

Accordingly, a subset of the input comments 110 and/or 114 are provided to the n-gram lexicon builder logic unit 128 to build the n-gram lexicon 126. In turn, the n-gram lexicon 126 is used to control the n-gram extraction unit 124 to process only n-grams of the input comments 110 and/or 114 that appear in the n-gram lexicon 126.

The output of the n-gram extraction unit is used to build a bag-of-n-grams matrix 130, which includes a matrix of n-grams extracted from the input comments (e.g., n-grams that are present in the comments processed by the machine learning training unit 102 and in the lexicon 126) and counts indicating a frequency of appearance of each of the n-grams in the comments. In some examples, the matrix 130 is applied to the probabilistic model parameter learning unit 104 during a training mode to train the model to determine, for each possible root cause, a respective probability that each n-gram of the lexicon (that appears in the comments) is associated with that root cause. In other words, the model is trained to determine, for each possible root cause, the likelihood that the root cause is associated with a comment that includes a given n-gram of the lexicon. In some examples, in the model, each n-gram has a defined probability associated with each possible root cause, and a combination of the probabilities for each n-gram of a comment is used to calculate a respective probability that each possible root cause is the root cause of the return associated with that comment. The output of the probabilistic model parameter learning unit 104 thus includes posterior distributions of n-gram probabilities for each root cause label.

In some examples, the model is also trained to determined, for each possible root cause, a respective probability that each return reason code, provided at 112 and 116, is associated with that root cause. In other words, the model is trained in such examples to determine, for each possible root cause, the likelihood that the root cause is associated with a return reason code that was specified by the customer. The model combines this likelihood with the combination of probabilities for each n-gram, as discussed above, to calculate a respective probability that each possible root cause is the root cause of the return associated with that comment. The output of the probabilistic model parameter learning unit 104 thus includes posterior distributions of return reason code probabilities for each root cause label.

The machine learning training output 131 is provided as input to a machine learning inference unit 135, as shown in more detail with respect to FIG. 1B. Turning to FIG. 1B, the machine learning inference unit 135 also receives as input an unlabeled input dataset 137. The unlabeled input dataset 137 includes return reason comments 139 and, optionally, return reason codes 142, each of which is, in some examples, mapped to and/or otherwise associated with a respective comment of comments 139. In some examples, the comments 139 and/or the codes 142 include some or all of the comments 110 and/or codes 112 of FIG. 1A used for training (e.g., the datasets 106 and 137 at least partially overlap). In other examples, the comments 139 and/or the codes 142 are not included in the dataset 106 of FIG. 1A (e.g., the datasets 106 and 137 are independent from one another and do not overlap).

The n-gram extraction unit 124 is applied to the input dataset 137 (e.g., to the comments 139) to extract n-grams as described above and build a bag-of-n-grams matrix 141. In some examples, the bag-of-n-grams matrix 141 is only based on the n-grams extracted from the input comments 139. The bag-of-n-grams matrix 141 and the posterior distributions of model parameters 133 (from the machine learning training output 131 shown in FIG. 1A) are applied to a probabilistic model root cause inference unit 144 to generate machine learning inference unit output 132.

As will be described in more detail below, the use of a Bayesian network as probabilistic model enables the model root cause inference unit 144 to also determine uncertainties relating to the probability estimations. Accordingly, the machine learning inference unit 135 provides output 132, which includes a per-comment predicted root cause probability distribution 134, a per-comment root cause prediction uncertainty 136, and a per-comment list of relevant n-grams for each root cause 138. In some examples, the output 132 also includes aggregated outputs, such as aggregated predicted root cause probability distribution 146, aggregated root cause prediction uncertainty 148, and aggregated list of relevant n-grams for each root cause 150. Examples of these outputs are described in more detail below with respect to FIGS. 2-4.

One or more of the outputs of the machine learning analysis unit are provided to a seller user interface 140, which is presented to a user (e.g., displayed on a display device associated with a seller computing device). In some embodiments, the seller user interface 140 optionally also receives at least a portion of the input dataset 137. In some examples, as described in more detail below, the user interface 140 presents portions of customer return reason comments with n-grams that relate to a selected root cause being highlighted in order to inform the seller of the reasoning behind the probability estimation for that root cause. An example of the seller user interface 140 is described in more detail below with respect to FIG. 4.

Figure 2:
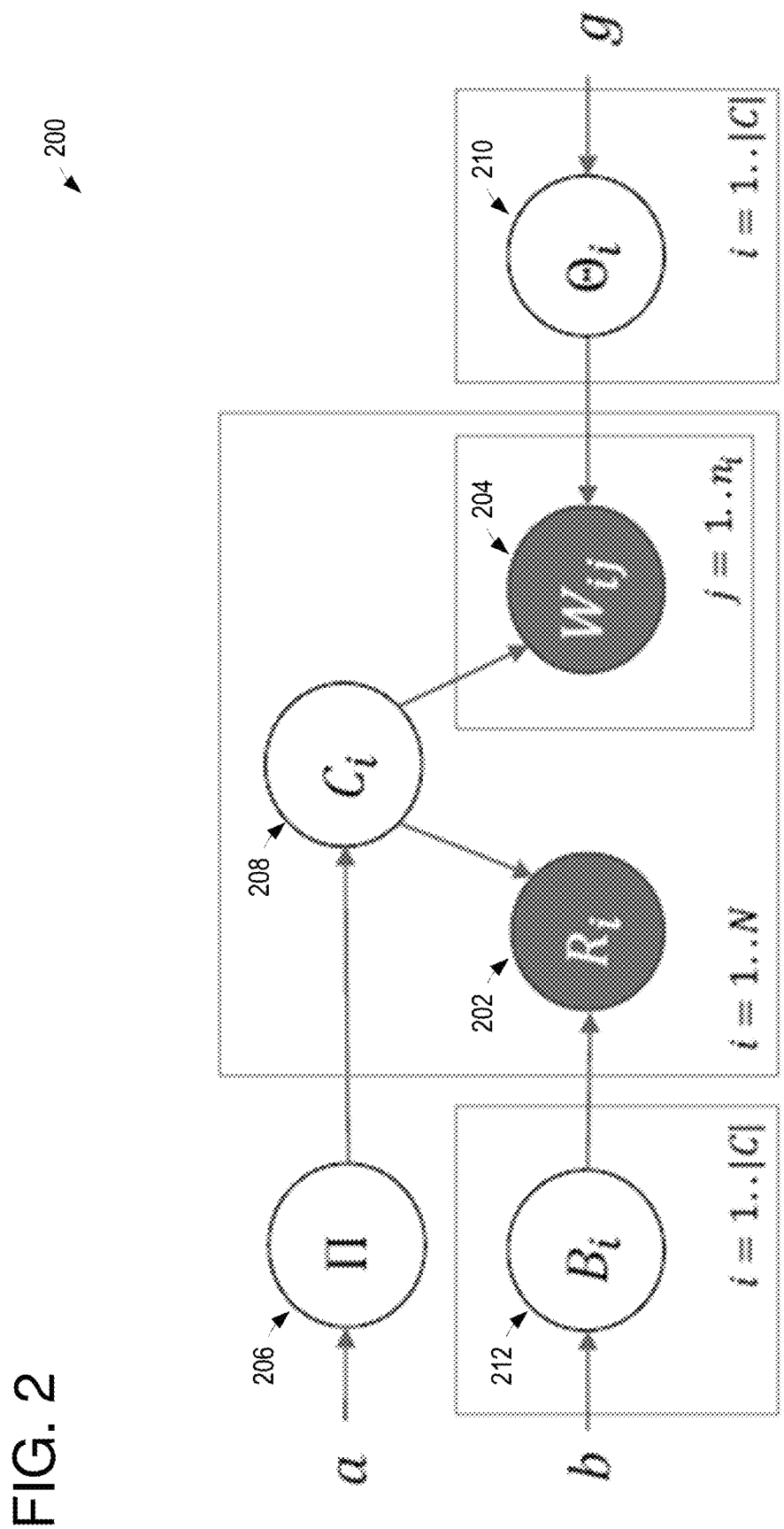
FIG. 2 shows an example representation of a Bayesian network used to estimate root causes of customer returns.

FIG. 2 is a plate diagram for an example Bayesian network model 200. For example, the Bayesian network model 200 is an example of the probabilistic model associated with the probabilistic model parameter learning unit 104 of FIG. 1A and the probabilistic model root cause inference unit 144 of FIG. 1B. In some examples, the Bayesian network model 200 is a latent variable Bayesian network model with a hidden root cause node and observed return reason code and comment n-grams nodes. The constants |R|, |W|, |C|, $n_i$, and N denote, respectively, the number of return reason code labels, the size of the n-gram lexicon, the number of root cause labels, the number of n-grams in the ith return, and the total number of returns.

A first observed variable is shown at 202 and corresponds to $R_i \in \{1 \ldots |R|\}$, i=1 ... N. Accordingly, $R_i$ is defined as a customer selected return reason code for the ith return. A second observed variable is shown at 204 and corresponds to $W_{ij} \in \{1 \ldots |W|\}$, i=1 ... N, j=1 ... $n_i$. Accordingly, $W_{ij}$ is defined as the n-gram at the jth position of the ith return.

A first hidden variable is shown at 206 and corresponds to $\Pi \in [0, 1]^{|C|}$. Accordingly, H is defined as a vector of probabilities over root causes. A second hidden variable is shown at 208 and corresponds to $C_i \in \{1 \ldots |C|\}$, i=1 ... N. Accordingly, $C_i$ is defined as the root cause of the ith return. A third hidden variable is shown at 210 and corresponds to $\Theta_i \in [0, 1]^{|W|}$, i=1 ... |C|. Accordingly, $\Theta_i$ is defined as a vector of conditional probabilities over the n-gram lexicon for the ith root cause. A fourth hidden variable is shown at 212 and corresponds to $B_i \in [0, 1]^{|R|}$, i=1 ... |C|. Accordingly, $B_i$ is defined as a vector of conditional probabilities over return reason code for the ith root cause.

In some embodiments, a generative description of the model 200 includes the following:
Sample $\pi$~Dir ($\Pi$; a)
for i=1 ... |C|
    Sample $\Theta_i$~Dir ($\Theta_i$; g)
    Sample $\beta_i$~Dir ($B_i$; b)
for i=1 ... N
    Sample $c_i$~Cat ($C_i$; $\pi_i$)
    Sample $r_i$~Cat ($R_i$; $\beta_{c_i}$)
    for j=1 ... $n_i$
        Sample $w_{ij}$~Cat ($W_{ij}$; $\theta_{c_i}$)

In some embodiments, the joint distribution for the model 200 is expressed as:

$$p(\pi, \{\beta_i\}, \{\theta_i\}, \{c_i\}, \{r_i\}, \{w_{ij}\}|a, b, g) = \tag{1}$$

$$Dir(\pi; a)\prod_{i=1}^{|C|}Dir(\beta_i; b)Dir(\theta_i; g)\prod_{i=1}^{N}Cat(c_i; \pi)Cat(r_i|\beta_{c_i})\prod_{j=1}^{n_i}Cat(w_{ij}; \theta_{c_i})$$

Inputting the probability density functions (PDFs) of the Cat and Dir distributions and simultaneously collapsing the distribution by eliminating $c_i$, the following log joint is obtained:

$$p(\pi, \{\beta_i\}, \{\theta_i\}, \{r_i\}, \{w_{ij}\}|a, b, g) \propto \tag{2}$$

$$\prod_{i=1}^{|C|}\pi_i^{a-1}\prod_{j=1}^{|R|}\beta_{ij}^{b-1}\prod_{j=1}^{|W|}\theta_{ij}^{g-1}\prod_{i=1}^{N}\sum_{c=1}^{|C|}\pi_c\beta_{c,r_i}\prod_{j=1}^{n_i}\prod_{k=1}^{|W|}\theta_{c,k}^{1(w_{ij}=k)} \propto$$

$$\prod_{i=1}^{|C|}\pi_i^{a-1}\prod_{j=1}^{|R|}\beta_{ij}^{b-1}\prod_{j=1}^{|W|}\theta_i^{g-1}\prod_{i=1}^{N}\sum_{c=1}^{|C|}\pi_c\beta_{c,r_i}\prod_{k=1}^{|W|}\theta_{c,k}^{N(k\in w_{1,\bullet})}$$

The last line uses the sufficient statistic $N(k \in w_{i,\bullet})$, for each ith return, defined as the count of occurrences of n-gram k among the ith return's comment n-grams $w_{i,\bullet}$. The description above assumes that the root cause labels are completely hidden, leading to a fully unsupervised training regime. If root cause labels are observed for a portion of the returns, these are, in some examples, used in a semi-supervised regime to help characterize the kinds of patterns targeted for learning. In particular this limited labeled set is useful for making sure that the inferred latent root causes correspond to the target root causes. The constants a, b, and g are the symmetric Dirichlet hyper-parameters for the priors of the hidden variables. For example, the priors include a probability distribution that would express one's beliefs about the associated quantity before evidence is taken into account. As such, the primary purpose of the hyper-parameters is to establish the a-priori desired sparseness of the distributions. For instance, in some embodiments, each root cause class is associated with a small set of enriched relevant n-grams, with the many if not most of the n-grams receiving zero mass. To ensure this level of sparseness the hyper-parameter g is, in some examples, set to be <1, with the level of sparseness increasing as g tends to 0.

The joint PDF presented below is a modification of equation (2) (shown above), which is used in a semi-supervised learning regime in some examples. An assumption for the below equation is that the unlabeled set $\{r_i, \{w_{ij}\}|i=1 \ldots N\}$ of returns is provided and a much smaller labeled set $\{c'_i, r'_i, \{w'_{ij}\}|i=1 \ldots N'\}$ is provided.

$$p(\pi, \{\beta_i\}, \{\theta_i\}, \{r_i\}, \{w_{ij}\}\{r'_i\}, \{w'_{ij}\}, \{c'_i\}|a, b, g) \propto \prod_{i=1}^{|C|} \pi_i^{a-1} \quad (3)$$

$$\prod_{j=1}^{|R|} \beta_{ij}^{b-1} \prod_{j=1}^{|W|} \theta_{ij}^{g-1} \prod_{i=1}^{N} \sum_{c=1}^{|C|} \pi_c \beta_{c,r_i} \prod_{j=1}^{|W|} \theta_{c,j}^{N(j \in w_1)} \prod_{i=1}^{N'} \pi_{c'_i} \beta_{c'_i, r'_i} \prod_{k=1}^{|W|} \theta_{c'_i, k}^{N(k \in w'_i, \bullet)}$$

Bayesian inference is used in some examples to learn the posterior distributions over the parameters: $p(\pi, \{B_i\}, \{\Theta_i\}|\{r_i\}, \{w_{ij}\}, \{w'_{ij}\}, \{c'_i\})$. In some embodiments, Hamiltonian Monte Carlo (HMC) is utilized. Thanks to GPU processing, it is possible to complete 7000 iterations of the HMC algorithm within several hours, despite having 800000 observations, using the PyMC3 probabilistic programming library for the inference backend, with the Theano library enabling the efficient computation of the joint equation (3). In additional or alternative examples, Automatic Differentiation Variational Inference (ADVI) is used, however ADVI may not be able to achieve comparable performance to Markov Chain Monte Carlo (MCMC). This may be due to insufficient hyper-parameter exploration, or to the fact that ADVI forces posterior independence between the parameters, which is a significant simplification that voids the complex relationship between the patterns in n-gram usage and the selection of reason codes.

Once the parameter posteriors have been inferred, they are used, in some examples, to infer the predictive posterior for the root cause, given the observed return reason code and comment n-grams. Below, the posterior predictive probability is defined, which is used to classify the root cause.

$$p(C = c|\tilde{r}, \{\tilde{w}_J\}) = \frac{1}{M} \sum_{(\pi, \{\beta_i\}, \{\theta_i\}) \sim posterior}^{M} p(C = c|\tilde{r}, \{\tilde{w}_J\}, \pi\{\beta_i\}, \{\theta_i\}) \quad (4)$$

$$p(C = c|\tilde{r}, \{\tilde{w}_J\}, \pi\{\beta_i\}, \{\theta_i\}) = \frac{\pi_{\tilde{c}} \beta_{\tilde{c}, \tilde{r}} \prod_{k=1}^{|W|} \theta_{\tilde{c},k}^{N(k \in \tilde{w}:)}}{\sum_{c=1}^{|C|} \pi_c \beta_{c, \tilde{r}} \prod_{k=1}^{|W|} \theta_{c,k}^{N(k \in \tilde{w}:)}} \quad (5)$$

The posterior samples of the parameters, mentioned in (4), are obtained by taking the last 1000 iterations of the HMC algorithm. In some examples, uncertainty estimates of all parameter inferences are computed, defined simply as the variances of the parameter samples over the last 1000 HMC iterations. A higher variance indicates a greater measure of uncertainty/guessing on the part of the model. This is indicative of either a high degree of data variance or the inability of the model to properly capture the patterns in the observed quantities, or both. For instance, high variance in the conditional probability of some n-gram z given some latent root cause c may indicate that the model lacks enough expressiveness and structure to adequately capture the usage patterns of that n-gram, indicating the need for a deeper language modeling. It may also indicate a more random/patternless usage of that n-gram. In the below example of experimental validation, an example method for using these parameter uncertainty estimates to make better predictions of the root cause is described.

In addition to estimating parameter uncertainties, the uncertainty of each specific prediction is, in some examples, measured directly. An example operation for such a measurement includes computing $p(C=c|\tilde{r}, \{\tilde{w}_j\}, \pi, \{\beta_i\}, \{\theta_i\})$ for each of the last 1000 HMC samples, and computing the variance of these posterior predictive probabilities. In some embodiments, this predictive variance is used to improve the fidelity of the model predictions by filtering predictions with above threshold predictive variance.

Figure 3:
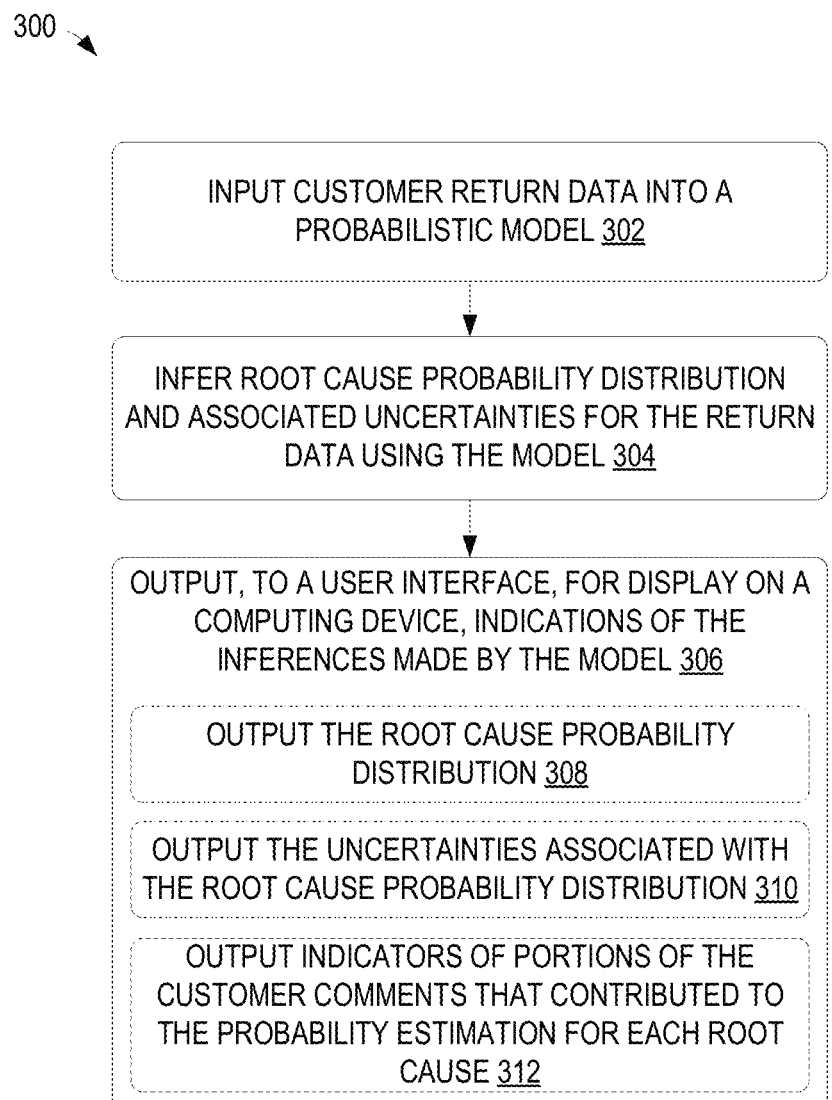
FIG. 3 shows a flow chart of an example method for estimating and conveying information regarding the estimations of root causes of customer returns.

FIG. 3 is a flow chart of an example method 300 for estimating a root cause of a return. In some embodiments, method 300 is performed using components of a machine learning and/or probabilistic modeling system, such as system 100 of FIGS. 1A and 1B. At 302, the method includes inputting customer return data into a probabilistic model. In some examples, inputting the customer return data includes inputting pairs of customer comments and associated customer-selected return reason codes. Customer comments and associated customer-selected return reason codes are entered by associated customers via a user interface for processing product returns in some examples. In other examples, only customer comments are input into the model and/or additional data is input into the model (e.g., customer reviews of an associated product, etc.). In some embodiments, the entered return information is aggregated and/or stored for use in evaluating a customer experience related to purchasing products from one or more sellers. In some embodiments, the return information is retrieved and/or transmitted from a storage location and provided to a processing unit (e.g., machine learning inference unit 135 of FIG. 1B) for evaluation according to the following operations of method 300.

At 304, the method includes inferring a root cause probability distribution and associated uncertainties for the returns data (e.g., for each customer comment and return reason code pair) using the probabilistic model. In some embodiments, the inference is performed using a Bayesian network as described above with respect to FIG. 2. Detailed examples of inferring the root cause probability distribution and associated uncertainties are described below with respect to FIG. 5B.

Figure 4:
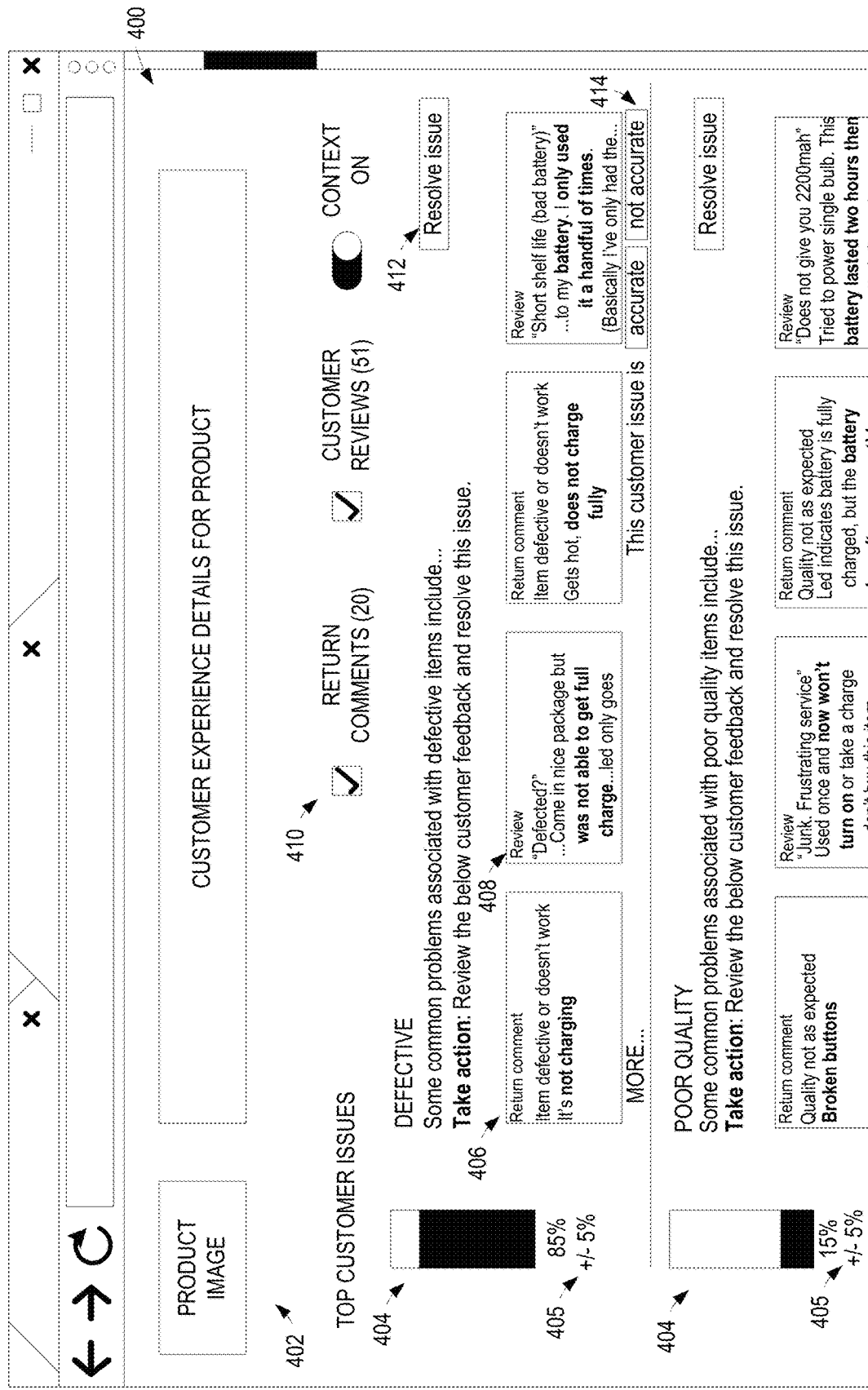
FIG. 4 shows an example graphical user interface for conveying information regarding estimations of root causes of customer returns.
Figure 9:
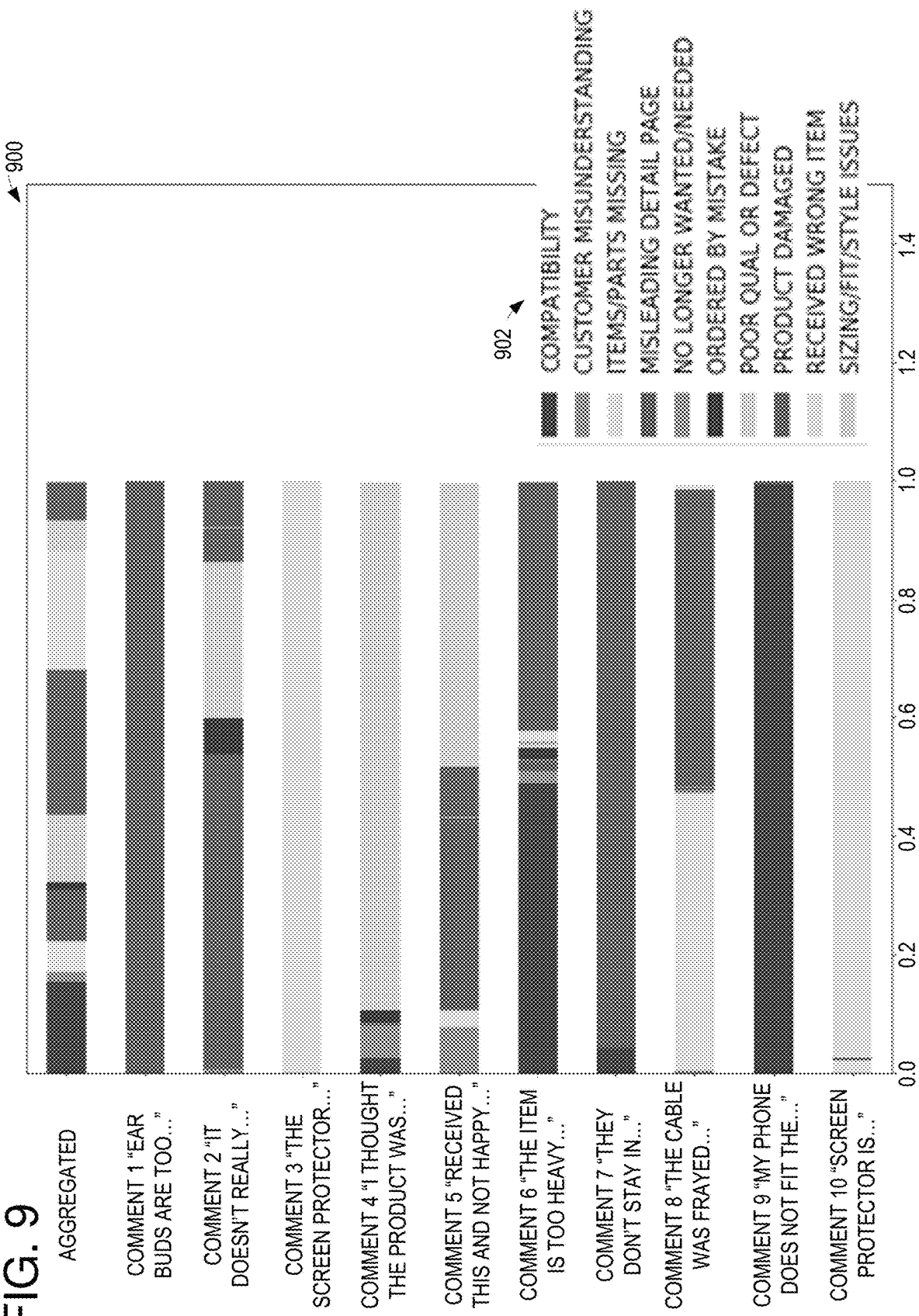
FIG. 9 shows an example visualization of a probability distribution of root causes estimated for a plurality of comments.

At 306, the method includes outputting, to a user interface for display on a computing device, indications of the model inferences. Outputting to the user interface may include transmitting (e.g., from a system such as system 100 of FIGS. 1A and 1B), to a display device (e.g., the display of the computing device) and/or an intermediary device in communication with the display device, information/data and/or other signals that cause the display device to display the user interface and/or one or more elements of the user interface, such as the elements described below. For example, as indicated at 308, the output optionally includes the inferred root cause probability distribution. In some examples, graphical representations of the probability distributions (e.g., charts, tables, graphs, etc.) and/or text/numbers/characters describing the probability distributions are output via a user interface to enable the seller to see percentages of probabilities for each root cause (or a top root cause or select number of top root causes having the highest probabilities or probabilities over a threshold) being the reason for a given return or set of returns and/or percentages of returns that are estimated to be associated with each represented root cause based on the evaluation of return data for the seller using the probabilistic model. In some examples, the probability distribution is shown on a per-comment basis, for a group of comments, for a given product, etc. FIG. 4 shows an example indication of probability distributions (showing inferred probability for top customer issues associated with a given product) and FIG. 9 shows an example indication of probability distributions across all possible root causes for each of a plurality of comments.

Figure 10:
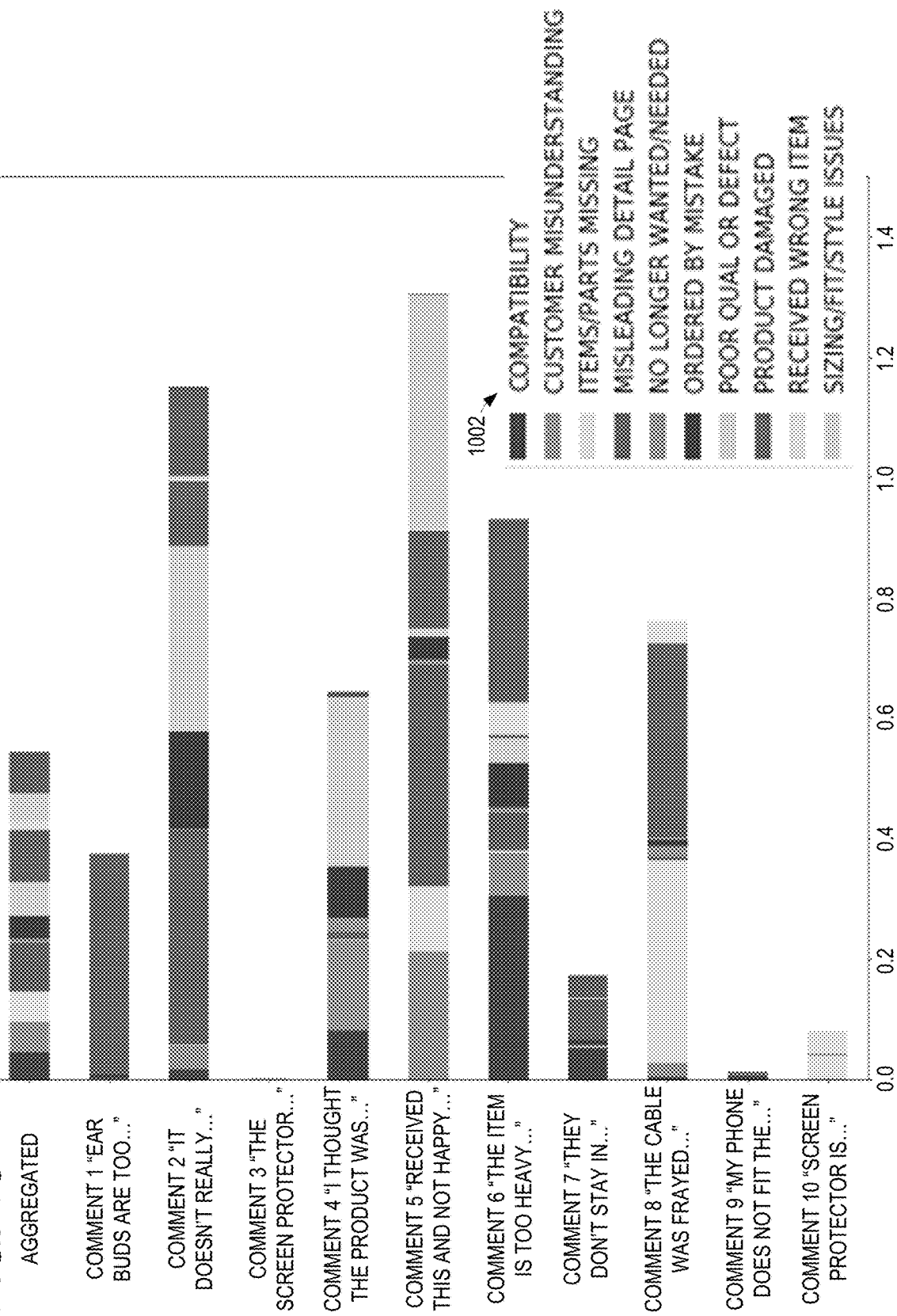
FIG. 10 shows an example visualization of an uncertainty distribution for the probabilities indicated in FIG. 9.

As indicated at 310, the output may additionally or alternatively optionally include uncertainties associated with the root cause probability distribution generated by the probabilistic model. In some examples, graphical representations of the uncertainty and/or text/numbers/characters describing the uncertainty are output via the user interface individually or alongside the probability distribution in order to enable the seller to gauge a confidence in the probabilistic model results. In some examples, the uncertainty distribution is shown on a per-comment basis, for a group of comments, for a given product, etc. FIG. 4 shows an example indication of uncertainty distributions (showing inferred uncertainty for top customer issues associated with a given product) and FIG. 10 shows an example indication of uncertainty distributions across all possible root causes for each of a plurality of comments.

As indicated at 312, the output optionally further additionally or alternatively includes indicators of portions of the customer comments that contributed to the probability estimation for each root cause. In some examples, portions of comments are presented in the user interface highlighting n-grams that contributed to the probability estimation that the comment was associated with an estimated root cause. It is to be understood that, in some embodiments, any combination of the example indications described above at 308, 310, and 312, and/or any additional information derived from the performance of the inference at 306 (e.g., a percentage of comments that have a highest likelihood of being associated with a selected root cause) may be output to indicate the model inferences.

Examples of output visualizations are shown in FIG. 4. For example, FIG. 4 shows a user interface 400, which is, in some examples, presented via a display device associated with a seller, vendor, or other inventory owner (e.g., within a web browser or other application executed on a computing device including and/or in communication with the display device). As shown in the illustrated example, the user interface 400 identifies, for a given product (e.g., identified in region 402 of the user interface), top customer issues relating to returns of the product and/or reviews of the product.

In an example embodiment, customer return information and/or customer reviews for the product are processed according to method 300 and/or any of the disclosed methods or systems (e.g., using a probabilistic model, such as model 200 of FIG. 2) to determine statistics regarding return reasons for the product. In the illustrated example, a list of root causes of returns are provided, in order of most frequently observed (based on the output of the processing/probabilistic model). For each root cause in the list, information regarding a percentage of returns and/or comments that are estimated to relate to that root cause is provided via a respective graphical element 404. In some embodiments, a respective graphical element 405 provides an indication of an uncertainty associated with the respective percentage indicated at 404.

Additionally, for each root cause in the list, information regarding free-text customer return comments and/or reviews are shown. For example, at 406, an excerpt of a return comment estimated to be associated with the "DEFECTIVE" root cause based on the probabilistic model is shown, with n-grams (in the illustrated case, an n-gram) that contributed to the estimation of association highlighted (e.g., shown in bold text). In additional or alternative examples, additional information, such as a probability distribution across all or top likelihood (e.g., a highest 2 or more root causes, or each root cause that has above a threshold likelihood, such as 10%) root causes for a respective comment, is shown in associated with each comment. At 408, an excerpt of a customer review estimated to be associated with the "DEFECTIVE" root cause based on the probabilistic model is shown, similarly presenting n-grams that contributed to the estimation in a highlighted manner. It is to be understood that the estimation of the percentage of returns and/or concerns relating to a given root cause may be based on customer return comments only, customer reviews only, or both customer return comments and customer reviews without departing from the scope of this disclosure. The user interface 400, in some examples, also includes view options 410 that are selectable to control whether customer return comment information or customer review information (or both, or neither) are shown.

The user interface 400 also includes graphical elements (e.g., interactive graphical elements) that enable a user (e.g., a seller) to provide feedback regarding the estimation of the customer issues and/or to make steps to resolve the estimated customer issues. For example, selection of a "Resolve issue" button 412 results, in some embodiments, in the display of information to guide the user through resolving the associated root cause of returns (e.g., suggesting actions that the seller can take to resolve the root cause, such as adjusting a description of the product for a "MISLEADING DETAIL PAGE" root cause or performing more robust quality control for "DEFECTIVE" or "POOR QUALITY" root causes).

As another example, selection of an accuracy feedback button 414 results, in some embodiments, in the sending of the feedback to an administrator of the system providing the probabilistic modeling services for improving a performance of the probabilistic model. Selection of the accuracy feedback button 414 additionally or alternatively results, in some embodiments, in the display of further options for the user to provide more detailed feedback, such as an indication of n-grams or comments/reviews that do not appear to match an estimated root cause indicated in the user interface.

It is to be understood that the data visualizations and interactive elements shown in FIG. 4 are representative in nature, and in other examples, any suitable information relating to the output described at 306-312 of FIG. 3 and/or in other areas of the disclosure are presented via the user interface 400.

Figure 5A:
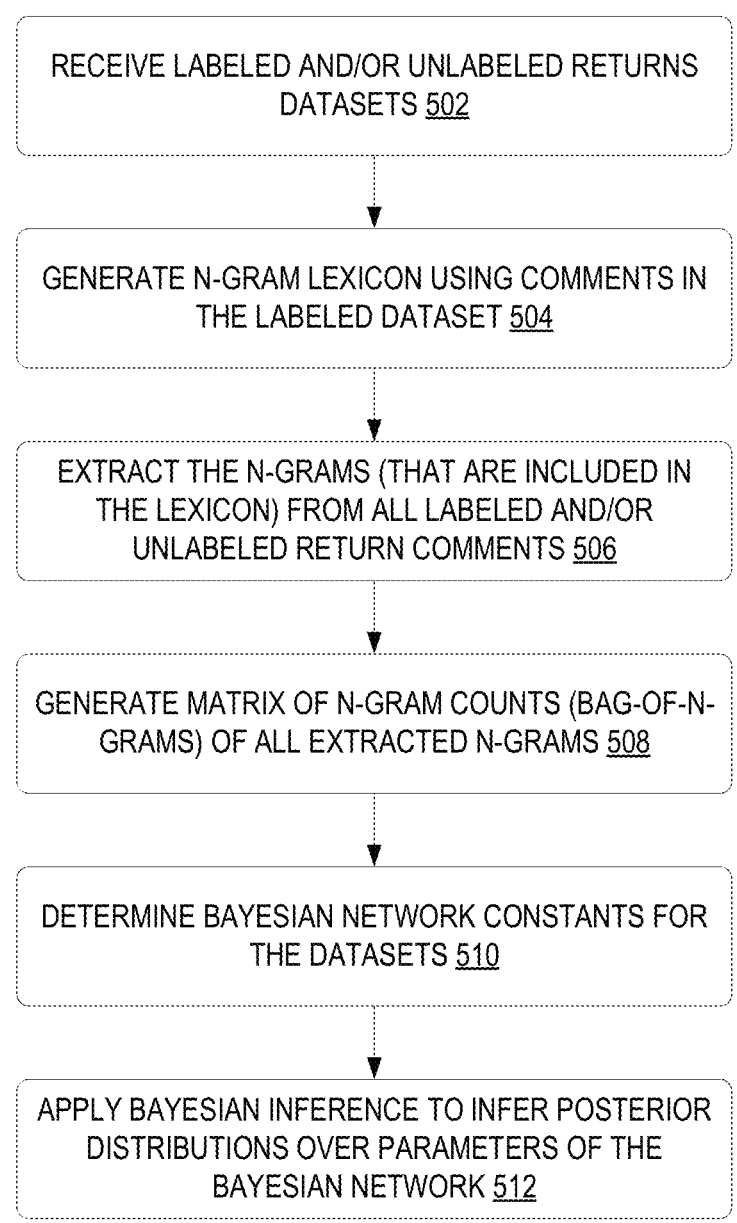
FIGS. 5A and 5B show flow charts for an example detailed method of training a Bayesian network and estimating root causes of customer returns using the trained Bayesian network.
Figure 5B:
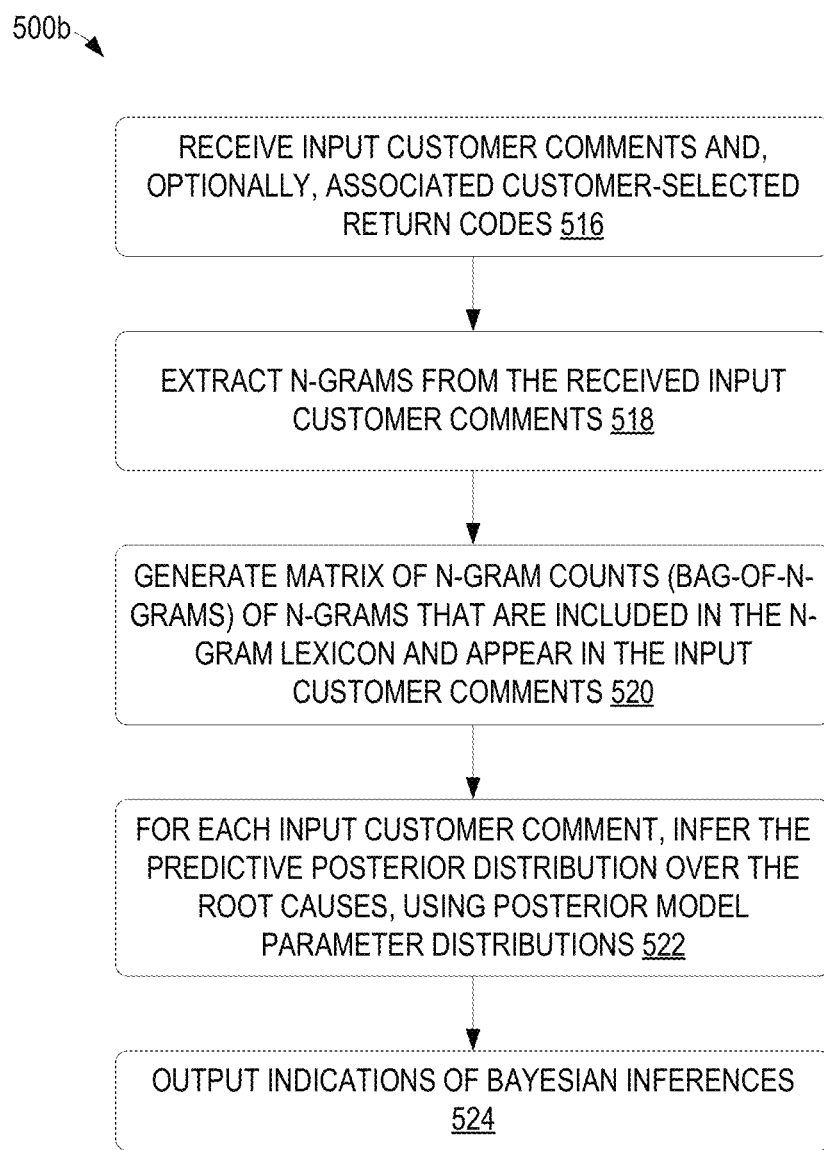

FIGS. 5A and 5B are flow charts of methods 500a and 500b for processing customer-entered data with a probabilistic model. In some embodiments, at least a portion of method 500a of FIG. 5A is performed to train the Bayesian network 200 of FIG. 2 and/or another probabilistic model according to the present disclosure. The model trained by method 500a is, in some embodiments, applied via execution of method 500*b* of FIG. 5B to estimate probabilities of root causes for each return represented by the customer-entered data.

At 502, the method includes receiving labeled and/or unlabeled returns datasets. The returns datasets include, for each of a plurality of returns, customer-entered data including a customer comment and an associated customer-selected return code, and (for the labeled dataset) an associated root cause label. In some examples, the returns data received at 502 corresponds to the unlabeled and/or labeled training datasets 106 and 108 of FIG. 1A. The returns data received at 502 is, in some examples, associated with a particular product sold by the seller and/or a group of products sold by the seller. It is to be understood that additional customer-entered data, such as customer reviews for the product(s), are included in the returns data set and/or otherwise used to help train the model or estimate root causes of dissatisfied reviews in some embodiments. In some examples, reviews that are rated below a threshold (e.g., reviews that rate a product "two stars" or below) may be included in the processing alongside customer comments (e.g., and associated with a [null] or similar value indicating that no return code is assigned thereto). In other examples, customer reviews are processed similarly but separately to customer return comments to provide targeted results of the probabilistic model relating only to low-rated customer reviews. Accordingly, the description herein relating to customer comments is understood to apply to customer return comments and/or customer reviews.

At 504, the method includes generating an n-gram lexicon using comments in the labeled dataset received at 502. As described above with respect to FIG. 2, in order to reduce processing resources, a relatively small amount of data (e.g., fewer comments than the total number of customer comments in the dataset received at 502) is used to determine n-grams of interest to be included in the n-gram lexicon.

One issue with simple bag-of-words models is their inability to learn complex interactions between words leading to phrases and expressions. To compensate for this limitation, the method includes compiling a lexicon of n-grams with n ranging from 1 to a selected maximum value. In one example, the maximum value of n is 4. Above 4, the n-grams may start to get much more unique, and possibly not generalizable n-grams. In other examples, the maximum value of n is selected based on the type of product(s) being evaluated and/or parameters (e.g., length, variety, etc.) of common words or phrases associated with issues that may arise with the product(s).

With the decision to include larger n-grams, the method is, in some examples, improved by considering and dealing with subgrams. This applies to both compiling the n-gram lexicon and to building the input bag-of-n-grams matrix, described in more detail below. Example rules/steps used to control the inclusion of subgrams in the processed n-gram processing logic are as follows:
1. For every n-gram that occurs in a comment, include it (the n-gram) in the lexicon only if its occurrence is not already a part of the occurrence of a longer (e.g., parent) n-gram, which is already part of the lexicon.
2. Include n-grams into the lexicon only if they are neither too rare nor too common. Use "too-rare" and "too-common" thresholds as tunable hyper-parameters.
3. Process larger n-grams first to make sure that in step 1, inclusion of all parent n-grams into the lexicon has already been decided.

As noted above, since the process to extract the n-gram lexicon is quite time intensive, in some examples, a smaller sample of returns are used to compile the lexicon than will be processed later in the method (e.g., to build the matrix of n-gram counts, described in more detail below). In some embodiments, the implementation of the above rules is non-trivial, as step 1 depends on step 2, and step 2 in turn depends on the completion of step 1. To address this, larger n-grams are processed first, finalizing step 2 (e.g., deciding which of the large n-grams are included in the lexicon and which are not), before this information is applied in step 1 on smaller n-grams. In other words, the n-grams are processed according to size, completing steps 1 and 2 for a longest as-yet-unprocessed size (e.g., starting with n-grams where n=4) before moving on to process a next-longest size of n-grams according to steps 1 and 2. As step 2 is conditioned on the "too-rare" and "too-common" thresholds, the method, in some examples, includes precomputing and storing locations of all n-grams in all of the comments of the data set. In some embodiments, this stored information is reused for different values of the thresholds. In some examples, the too-rare and too-common thresholds are non-zero values.

Once the n-gram lexicon is generated, essentially the same algorithm is used to build an n-gram counts matrix, as described below, for the entire corpus of returns. In some examples, the n-gram lexicon is tailored for a particular product or class of products and used for estimating root causes of issues relating to that product or class of products.

At 506, the method includes extracting the n-grams (that are included in the lexicon) from all return comments that are received at 502 (e.g., which includes labeled and/or unlabeled return comments). For example, n-grams are extracted from a larger number of customer comments (e.g., all of the customer comments of the data set) than the subset used at 504. The extraction of the n-grams at 506 and/or the subsequent processing of the n-grams described below at 508 utilizes the lexicon to target relevant n-grams (e.g., n-grams that are present in the lexicon).

At 508, the method includes generating a matrix of n-gram counts/frequencies (e.g., a bag-of-n-grams) of n-grams included in the lexicon that appear in the customer comments received at 502. For example, each n-gram of the lexicon may be associated with a count, and the count for each n-gram may be incremented each time a respective corresponding n-gram is found in the customer comments of the received datasets. Described another way, for each extracted n-gram (e.g., extracted at 506), the extracted n-gram may be compared to the n-grams in the lexicon. If the extracted n-gram matches an n-gram in the lexicon, a count for that n-gram may be increased.

At 510, the method includes determining Bayesian network constants for the datasets. As described in more detail with respect to FIG. 2, Bayesian network constants are, in some examples, determined prior to evaluation of a full data set of returns data (e.g., during a testing/validation phase for configuring the model) and/or in other examples may be continuously evaluated and updated to improved accuracy of the model. Accordingly, in some examples, the constants are stored in association with the model and retrieved at 510 for use with the model. In some examples, the constants are based on parameters of the data set and/or the product being evaluated on the data set.

At 512, the method includes applying Bayesian inference to infer posterior distributions over parameters of the Bayesian network. Examples of such inference are described above in more detail with respect to FIG. 2. For example, in some embodiments, the method includes utilizing an HMC algorithm to infer the posterior distributions over the parameters of the Bayesian network described above with respect to FIG. 2.

As described above, FIG. 5B shows a method 500b for applying the model trained via method 500a of FIG. 5A to estimate root causes of returns using customer-entered data. Accordingly, method 500b of FIG. 5B is, in some examples, performed at some point after the execution of method 500a of FIG. 5A. At 516, the method 500b includes receiving input customer comments and, optionally, associated customer-selected return codes (e.g., each return code being mapped to a respective customer comment). The customer comments and optional return codes received at 516 correspond, in some examples, to the comments 139 and/or codes 142 in the unlabeled input dataset 137 of FIG. 1B.

At 518, the method includes extracting n-grams from the received input customer comments (e.g., the comments received at 516). The extraction of n-grams at 518 is performed similarly to the extraction of n-grams at 506 of FIG. 5A, such that n-grams in the lexicon generated at 504 are extracted from the customer comments received at 516.

At 520, the method includes generating a matrix of n-gram counts (bag-of-n-grams) of n-grams that are included in the n-gram lexicon and that appear in the customer comments received at 516. The generation of the n-gram counts at 520 is performed similarly to the generation of the n-gram counts at 508 of FIG. 5A, such that a bag-of-n-grams is generated for the customer comments received at 516 to indicate the frequency of appearance of each n-gram in the lexicon within the comments received at 516.

At 522, the method includes inferring a predictive posterior for the root cause of each return associated with a customer comment received at 516. For example, the inferred posterior distributions over the parameters of the Bayesian network determined at 512 of FIG. 5A is used, in some embodiments, to infer the predictive posterior for the root cause given an observed return reason code and associated comment n-grams for that return within the dataset received at 516. Detailed examples of this inference are described above with respect to FIG. 2.

At 524, the method includes outputting indications of the Bayesian inferences. In some examples, the indications are output to a user interface of a seller's device and/or an intermediate device for access by the seller. In additional or alternative examples, the output is stored for later retrieval and/or aggregation (e.g., for historical/trend tracking). Examples of output indications that are used as the output at 524 in some embodiments are described above in more detail with respect to operation 306 of method 300 of FIG. 3 and example user interface 400 of FIG. 4. For example, in some embodiments, one or more of the user interface elements described above with respect to FIG. 4 correspond to example indications of the Bayesian inferences that are output at 524.

In an experimental validation of a system configured in accordance with the present disclosure, an example probabilistic model was validated on the returns of products, taking full advantage of the uncertainty estimates derived as described above. A random sample of 20000 returns was used, and the above-described n-gram building algorithm was applied to the random sample. The validation included experimentation with several too-rare and too-common thresholds. In the case of too rare, the threshold may be defined as the minimum allowed count of documents in which an n-gram from the lexicon occurs. Experimental ranges of values for the too-rare threshold are: {5, 10, 50, 100}. In the case of too-common threshold, a relative proportion of the total 20000 returns used in the lexicon building was considered. Experimental ranges of values for the too-common threshold are: {0.6, 0.7, 0.8, 0.9} (e.g., where n-grams occurring in 60%, 70%, 80%, and 90% of the total 20000 returns, respectively, were not included in the lexicon for respective experiments).

Once the training n-gram counts matrix is defined, the HMC algorithm is used to infer the posteriors over parameters $\Theta_i$, $B_i$, and H. Different values for the hyper-parameters b and g were used for experimentation purposes. For a, the non-informative uniform prior of 1 was used. In the cases of b and g, 0.9, 0.8, 0.7, and 0.6 (e.g., values that are less than 1 in order to induce sparseness in the conditional n-gram distribution and the conditional reason code distribution) were utilized in different experiments.

The experiments were conducted with the entire set of unlabeled returns plus 50% of the labeled set. The remaining 50% of the labeled returns were used to validate/test the model. In other examples, additional cross-validation are carried out using the 50% portion (that was used for validation/testing) to increase accuracy in selection of the best-performing hyper-parameters.

The model's performance was assessed with the metric of classification accuracy (hit-rate) on the test set. The top performing model in this example attained the accuracy of 80% and used the following hyper-parameter settings: too-rare threshold of 10, too-common threshold of 0.7, and g, b of 0.9.

For a deeper look into the model performance for the above settings, a confusion matrix 600 was plotted for comments relating to a selected type/category of product, as shown in FIG. 6. Along the y-axis of the confusion matrix 600, true root cause labels (e.g., selected by a human investigator that manually examines comments and assigns a root cause thereto) are shown, and corresponding predicted (e.g., estimated to have a highest likelihood via application of the probabilistic model, as described above with respect to FIG. 5B in some embodiments) root cause labels are shown along the x-axis. Thus, for example, for the comments labeled as being associated with the root cause "Compatibility" by the human investigator, a majority (120) of the comments were likewise estimated to be associated with the root cause "Compatibility" by the application of the model described herein. 32 of the comments labeled by the human investigator as "Compatibility" were estimated to instead be associated with the root cause "Poor Quality or Defective." Thus, each row of the matrix indicates the different estimated labels provided to comments labeled with a respective root cause by a human investigator.

One advantage of the Bayesian parameter inference described above is the ability to estimate both the uncertainty of the inferred parameter values and the uncertainty of the predictions/estimations themselves. Using the predictive uncertainty, returns for which the model is unsure of associated predicted/estimated classes are filtered out. While this reduces the proportion of examples that can be classified, this is, in some examples, used as a signal to improve the classification fidelity. In the absence of Bayesian uncertainty estimates, or predictive spread estimated via some other mechanism, such as bootstrapping, experimenters in some examples use the predictive probability scores themselves, filtering observations with predictive scores below some threshold.

Figure 7:
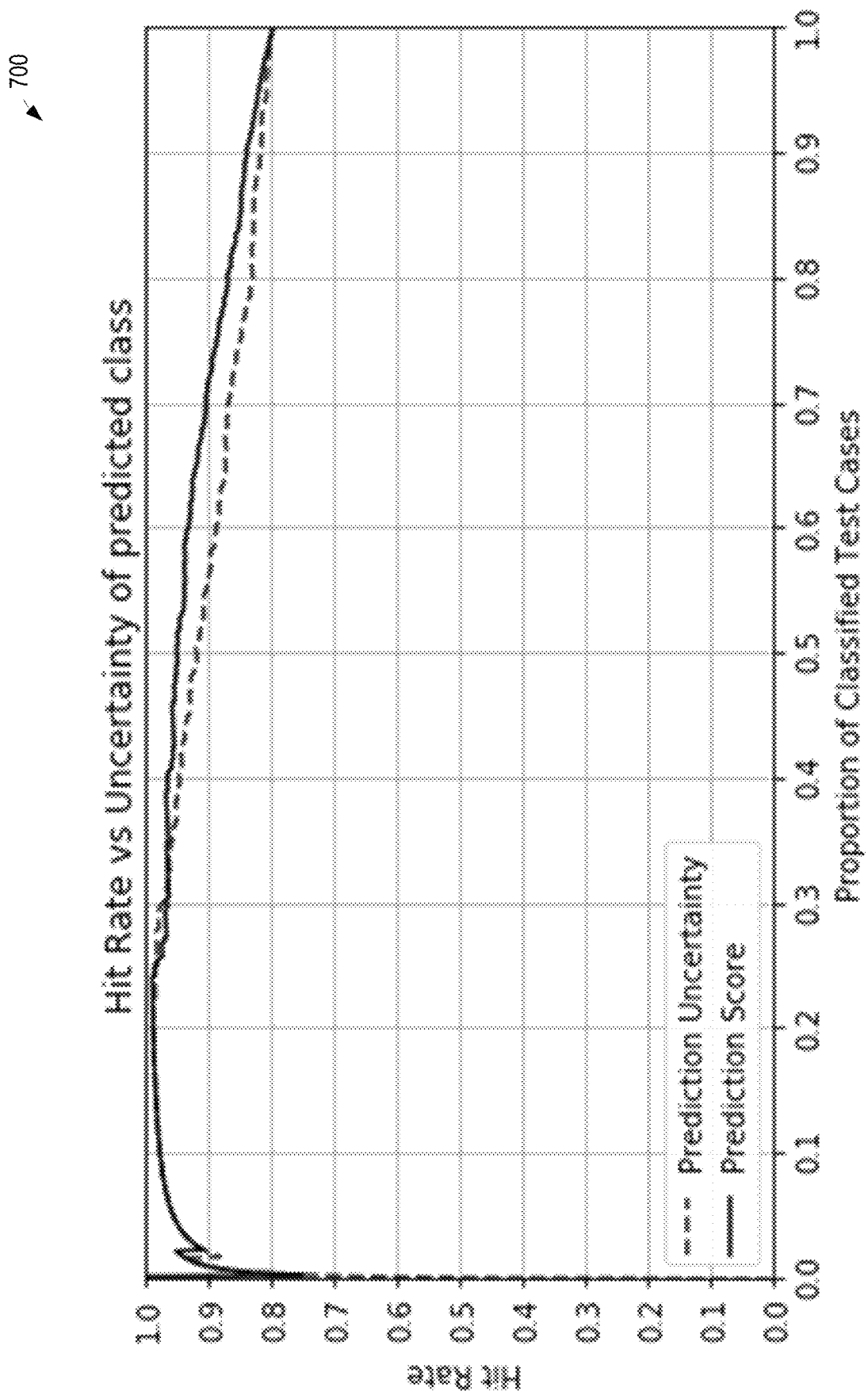
FIG. 7 is a plot comparing criteria based on predictive uncertainty thresholds with criteria based on prediction scores thresholds.

FIG. 7 shows a plot 700 of classification accuracy versus proportion of returns that pass the filtering criteria, thereby comparing criteria based on predictive uncertainty thresholds with criteria based on prediction scores thresholds. As shown in FIG. 7, predictive scores are a weaker signal than predictive uncertainty in improving prediction fidelity. For example, as shown in plot 700, choosing an uncertainty threshold that reduces the classified examples to half increases the accuracy to 94%, which is an improvement of over 10%. In contrast, using prediction scores to filter out 50% of the test cases only increases the accuracy to 90%.

Figure 8:
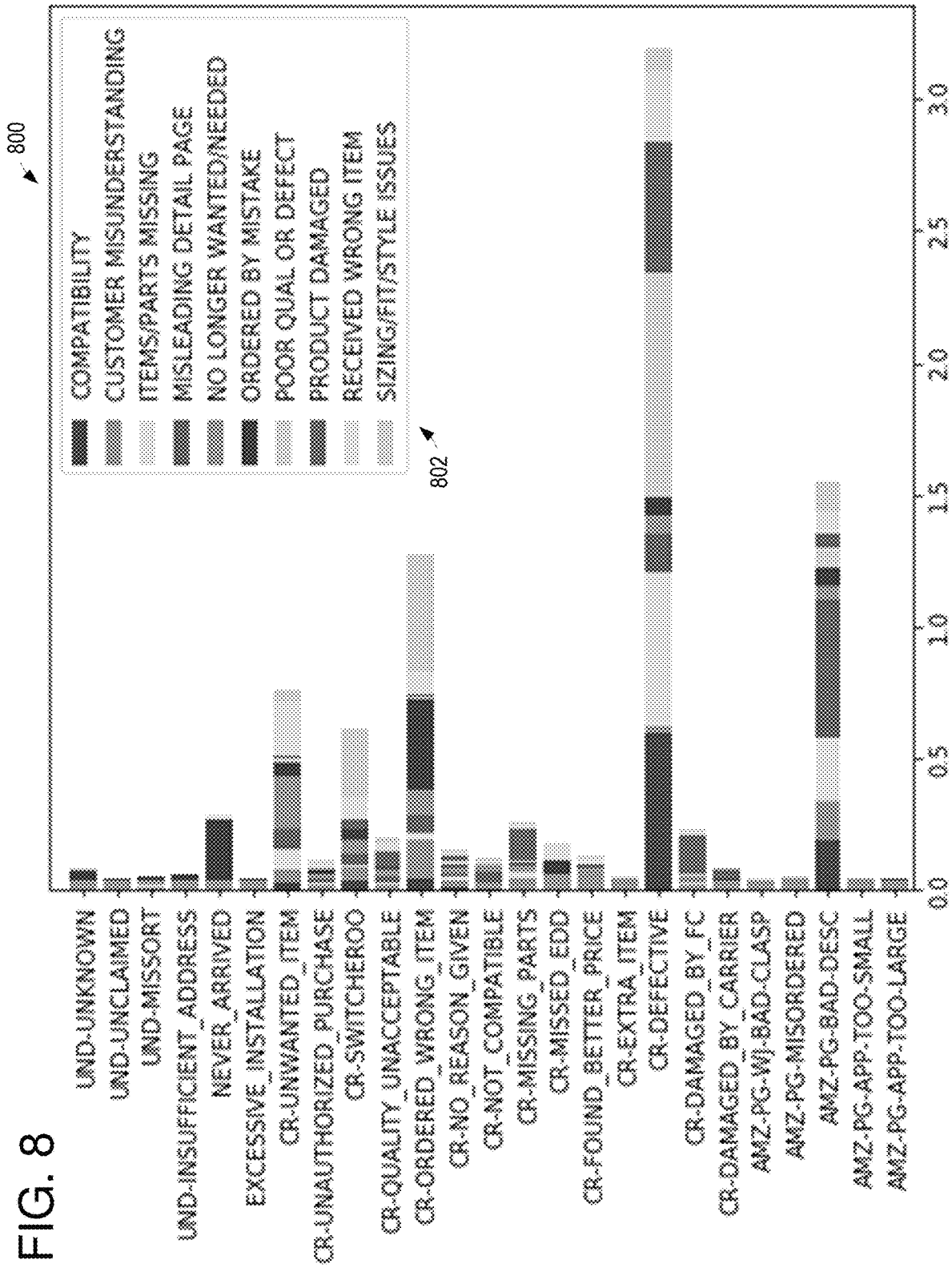
FIG. 8 shows an example graphical representation of a probability distribution for an example sample data set.

The probabilistic model examples described herein provide another advantage of ease of interpretability of results. After a model is validated, in some examples, the learned patterns are visualized, for example, by visualizing patterns of n-gram usage and selection of reason codes. FIG. 8 shows one example of a visualization 800, in which distributions of reason codes for an example sample data set are plotted, conditioned on each latent root cause. The y-axis in visualization 800 shows example selected reason codes for a group of comments, while the distribution of probabilities for each root cause (indicated in the legend 802), as estimated by inferring predictive posterior distributions using posterior model parameter distributions (e.g., described above at 522 of FIG. 5B), are shown for each reason code across the x-axis.

Further examples of distribution visualizations are shown in FIGS. 9 and 10. For example, visualization 900 of FIG. 9 shows an example distribution of root cause prediction probabilities for each of a plurality of comments. Visualization 1000 of FIG. 10 shows an example distribution of root cause uncertainty for each of the plurality of comments. In each visualization 900 and 1000, example comments are shown on the y-axis of the respective chart (with a topmost row representing an aggregation of all of the comments) and a distribution of probabilities (FIG. 9) or uncertainties (FIG. 10) for each root cause (indicated by the legend 902 and 1002 in FIGS. 9 and 10, respectively) is plotted along the x-axis of the respective chart.

For example, in FIG. 9, the first comment (e.g., "Ear buds are too large and not comfortable to wear. Also could not get them to play stereo mainly because the instructions are difficult to follow, lack clarity, and don't seem accurate.") has a distribution indicating approximately 90% likelihood that the root cause of the return associated with that comment is "Poor Quality or Defect" and approximately 10% likelihood that the root cause of the return associated with that comment is "Sizing/Fit/Style Issues." The second comment (e.g., "It doesn't really work like I thought it would. I guess it is not defective, I just misunderstood what it was. Sorry.") has a more varied distribution, with the largest probability (approximately 55-60%) associated with the root cause "Misleading Detail Page," the second largest probability (approximately 25%) associated with the root cause "Ordered by Mistake", and the remaining probabilities distributed between "Customer Misunderstanding," "No Longer Wanted/Needed," Poor Quality or Defect," and Product Damaged." The third comment (e.g., "The screen protector had a crack in it") is shown with a 100% likelihood that the root cause of the return associated with that comment is "Product Damaged." The probability distributions are based on the n-grams extracted from the comments (e.g., as described above with respect to operation 518 of FIG. 5B and below with respect to Tables 2-4), the association of the n-grams with root causes (e.g., as described below with respect to Tables 1-4), and the inference of predictive posterior distributions (e.g., as described above with respect to operation 522 of FIG. 5B).

FIG. 10 utilizes a similar mechanism to plot uncertainties associated with the probability distributions shown in FIG. 9. For example, for the first comment, there is a slight uncertainty relating to the 0% probability estimations for the root causes of "Misleading Detail Page" and "No Longer Wanted/Needed," and approximately 20% uncertainty of the respective probability estimations of approximately 90% and 10% for the root causes of "Poor Quality or Defect" and "Sizing/Fit/Style Issues." The uncertainty is derived from an inference of the predictive posterior distribution using the posterior model parameter distributions, such as performed at 522 of FIG. 5B.

Additionally, the disclosed visualizations include, in some examples, visualizing and analyzing the conditional distribution over the input lexicon to select the top n-grams for each root cause class. Table 1 (below) shows an example of top (e.g., 10) n-grams for 11 different root causes.

TABLE 1

| Root Cause | Top n-grams |
| --- | --- |
| COMPATIBILITY | compatible, fit my, compatible with, with my, doesn't fit, not fit, doesn't fit my, work with, ipad, not compatible |
| CUSTOMER MISUNDERSTANDING | think it was, think it, think was, i think it, i think it was, realize it, towel, realize, dvd, didn't realize it |
| ITEMS/PARTS MISSING | miss, is miss, are miss, come with, miss part, include, only receive, was miss, didn't come with, didn't come |
| MISLEADING DETAIL PAGE | description, picture, color is, website, color, dark, in picture, describe, color isn't, state |
| NEVER RECEIVED ITEM | happen, was deliver, deliver, email, to change, fake, it say it, process, kind of, of product |
| NO LONGER WANTED/NEEDED | don't need, longer need, no longer need, no longer, good price, cancel, longer, decide, need it, find |
| ORDERED BY MISTAKE | mistake, mean to, order wrong, buy wrong, by mistake, mean, accidentally, need NUM, mean to order, plus |
| POOR QUALITY OR DEFECTIVE | charge, stop, sound, turn on, poor, quality, stay, connect, turn, doesn't work |
| PRODUCT DAMAGED | break, crack, damage, is break, was break, scratch, dent, glass, is crack, break off |
| RECEIVED WRONG ITEM | was send, send, wrong color, i order, i receive, receive, and receive, i was send, send me, black |
| SIZING/FIT/STYLE ISSUES | tight, too small, small, too big, large size, too tight, chart, way too, big, small size |

Table 2 is an example portion of a chart mapping extracted n-grams from customer-entered comments to potential root causes. For example, within the comment "My phone does not fit the case" the n-grams "the case," "my phone," and "does not fit the" are mapped to the potential root cause of "Compatibility" issues. The mapping in Table 2 is based on a mapping of n-grams in a lexicon to root causes, such as the mapping described above with respect to Table 1.

TABLE 2

| Full Comment | Compatibility n-grams | Customer Misunderstanding n-grams | Items/Parts Missing n-grams | Misleading Detail Page n-grams | Sizing/Fit/Style Issues n-grams |
|---|---|---|---|---|---|
| My phone does not fit the case | the case; my phone; does not fit the | | | | |
| The cable wire was frayed | | | wire | | |
| They don't stay in, unfortunately | | They don't | | | |
| The item is too heavy and not fit my phone | fit my phone | | | | item is too |
| It doesn't really work like I thought it would | | | | It doesn't | really |
| Ear buds are too large and not comfortable to wear | | | | | are too |

Table 3 shows an example aggregation of n-grams associated with selected root causes for the sample of comments/root causes shown in Table 2.

TABLE 3

| Root Cause | Aggregated n-grams |
|---|---|
| Compatibility | the case; my phone; does not fit the; they don't; fit my phone |
| Customer Misunderstanding | |
| Items/Parts Missing | wire |
| Misleading Detail Page | it doesn't |
| Sizing/Fit/Style Issues | really; are too |

Table 4 is another example aggregation of n-grams associated with a larger list of root causes for a larger sample of comments than those shown in Table 2.

TABLE 4

| Root Cause | Aggregated n-grams |
|---|---|
| Compatibility | they don't; the case; fit my phone; my phone; doesn't fit the |
| Customer Misunderstanding | it was; was for |
| Items/Parts Missing | wire |
| Misleading Detail Page | it doesn't; accurate; what it; it isn't; look; gold |
| Never Received Item | |
| No Longer Wanted/Needed | this for |
| Ordered By Mistake | sorry |
| Poor Quality/Defective | charge the; my phone; stay in; follow; play; difficult to |
| Product Damaged | had a; screen protector; a crack; in it; crack in; is broken |
| Received Wrong Item | gold; receive |
| Search Engine Error | |
| Shipping Error | full refund |
| Sizing/Fit/Style Issues | really; item is too; accurate; are too |

The disclosure provides a machine learning-based approach for processing free-form comments and noisy reason codes entered by customers during returns with an objective of inferring the root cause labels. An example approach makes use of a Bayesian network with latent variables learned using Bayesian Inference. An example pipeline is described for building a rich n-gram lexicon from a selected corpus. The model for the Bayesian network is, in some embodiments, learned in the semi-supervised regime using a large corpus of unlabeled returns, possessing only the customer entered reason codes and comments, and a much smaller set of returns annotated with the true reason code. The example approaches increase seller trust and understanding regarding seller evaluations based on customer return feedback, and help sellers to more accurately identify and resolve customer issues with inventory provided by the sellers.

The example models described herein are based on probabilistic modeling, drawing on the concept of conditional independence of two observed signals (e.g., reason code and comment) with the latent root cause acting as the common dependency parent for both signals. Latent variable models form the basis for complex graphical models, and include Latent Dirichlet Allocation, Probabilistic Latent Semantic Analysis, Probabilistic Matrix Factorization, and others. An advantage of using latent variable models in the disclosed examples is that such models encourage the exploration of the hypothesis space in the purely unsupervised regime. With the addition of fully annotated/labeled observations, such models can be guided to attain desired characteristics of the learned structure.

The proposed solution also includes natural language processing (NLP) and Information Retrieval, such as bag-of-words/unigram models extended to include n-grams with $n<=4$.

In regards to root cause inference, deep learning architectures are, in some examples, applied using a three step process:
1. Mapping reason codes to root causes.
2. Use mapped root causes as targets/outputs to pre-train a deep language model that takes a comment as input and outputs the root cause.
3. Use the small set with ground-truth root cause labels to fine-tune the model.

In some examples, the disclosed approaches make use of bi-directional Long Short-Term Memory (LSTM) based autoencoders with the lexicon taken from the corpus of pre-trained word embeddings. As described above, the approach reaches 60% accuracy and provides a strong baseline for the gains provided by deep language models and the use of embedding scores. An additional or alternative approach includes using weighted term frequency-inverse document frequency (tf-idf) score to classify the comments instead of or in addition to processing the comments using deep language models.

An advantage of the disclosed mode over a purely supervised approach is the explicit modeling and formulation of the stochastic nature of observed reason codes. As such, the model has a higher tolerance to noise than other approaches. On a related note, the generative nature of the model allows it greater flexibility when dealing with missing data (e.g., an incomplete or empty customer return reason comment).

Additionally, latent variable models have a higher potential for future extensions vis-à-vis new sources of observable information as well as new latent structure. For example, the models described herein include, in some examples, a rather shallow language modeling module that serves as a skeleton for more complex latent variable models. In some embodiments, the models are endowed with deeper and more complex patterns using a deeper language modeling module (e.g., in the form of generative embeddings and auto encoding) and/or the model benefits from added structure that groups returns by standard identification numbers, sellers, and/or other criteria. The described approach illustrates the benefits of using Bayesian inference to assess model uncertainty, and using it to avoid unprincipled classification.

Figure 11:
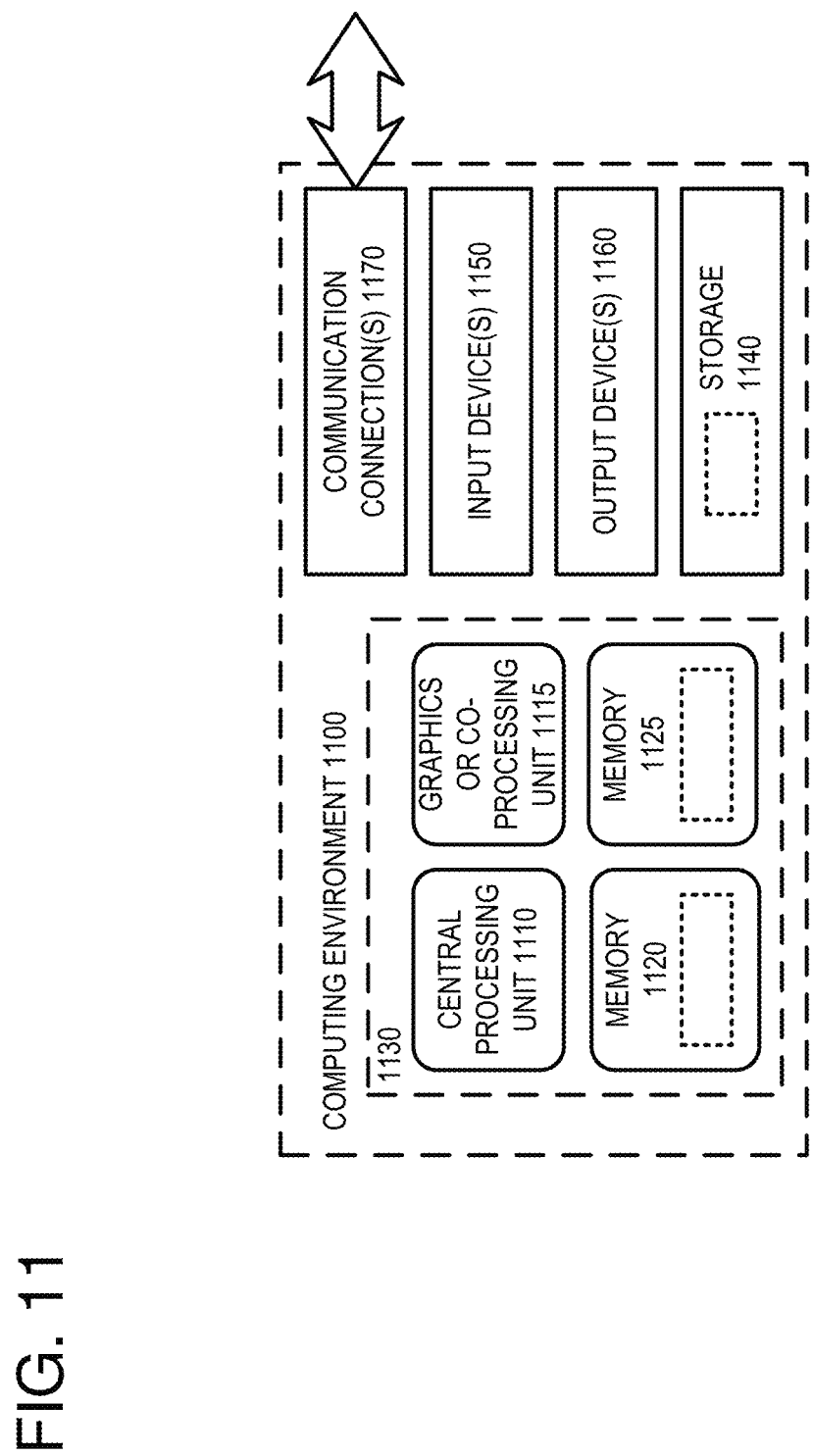
FIG. 11 depicts a generalized example of a suitable computing environment in which the described innovations may be implemented.

FIG. 11 depicts a generalized example of a suitable computing environment 1100 in which the described innovations are implemented in some embodiments. The computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., desktop computer, laptop computer, server computer, tablet computer, etc.).

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 is, in some examples, volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 is, in some examples, removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein.

The input device(s) 1150 is, in some examples, a touch input device such as a keyboard, mouse, pen, or trackball, a voice input device, a scanning device, or another device that provides input to the computing environment 1100. The output device(s) 1160 is, in some examples, a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of estimating a root cause of a return, the method comprising:
   receiving a returns data set including, for each of a plurality of returns, a customer comment and an associated customer-selected return code;
   extracting n-grams from the received customer comments for the plurality of returns;
   generating a matrix of n-gram counts of n-grams included in an n-gram lexicon that are present in the received customer comments;
   applying a Bayesian network model to infer posterior distributions over parameters of the Bayesian network model;
   for each return of the plurality of returns, inferring, using the posterior distributions, predictive posteriors and associated uncertainties for a respective root cause of the return based at least on the matrix of n-gram counts and the extracted n-grams from a received customer comment associated with the return; and
   outputting an indication of the predictive posteriors and associated uncertainties for the respective root causes of the plurality of returns.

2. The method of claim 1, further comprising outputting, for at least one return of the plurality of returns, an indication of n-grams in the customer comment associated with the return that contributed to an estimation of a root cause of the return.

3. The method of claim 1, wherein the Bayesian network comprises observed variables of $R_i$ and $W_{ij}$, where $R_i$ is a customer selected return reason code for an ith return of the plurality of returns and $W_{ij}$ is the n-gram at a jth position of the ith return.

4. The method of claim 3, wherein the Bayesian network comprises hidden variables of H, $C_i$, $\Theta_i$, and $B_i$, where $\Pi$ is a vector of probabilities over root causes, $C_i$ is the respective root cause of the ith return, $\Theta_i$ is a vector of conditional probabilities over the n-gram lexicon for the respective root cause of the ith return, and $B_i$ is a vector of conditional probabilities over return reason code for the respective root cause of the ith return.

5. The method of claim 4, wherein inferring posterior distributions over parameters of the Bayesian network model comprises inferring posterior distributions over the hidden variables of the Bayesian network.

6. The method of claim 1, wherein the predictive posteriors and associated uncertainties for a respective root cause of the return are further inferred based on the customer-selected return code for the return.

7. A method for generating a user interface for display at a display device, the method comprising:
   inputting customer-entered return data including customer-entered return reason comments into a probabilistic model;
   for each comment, inferring a root cause probability distribution and associated uncertainties using the probabilistic model;
   based on the inferred root cause probability distributions, determining an estimated root cause for each comment; and
   outputting, to the display device, indications of the inferred root cause probability distribution and associated uncertainties and/or indications of the determined estimated root cause for each comment.

8. The method according to claim 7, wherein the method further comprises:

for each of a plurality of possible root causes, outputting indicators of portions of the comments that contributed to a probability estimation for the root cause.

9. The method according to claim 7, wherein the probabilistic model is a Bayesian network.

10. The method according to claim 9, wherein the method further comprises:

extracting n-grams from the input customer-entered return reason comments, and generating a matrix of n-grams included in an n-gram lexicon that are present in the input comments, wherein, for each comment, the root cause probability distribution and associated uncertainties for the comment are based at least in part on the matrix of n-gram counts and the extracted n-grams from the comment.

11. The method according to claim 10, wherein the n-gram lexicon is generated based on a subset of the customer-entered return reason comments, and includes n-grams from the subset of the customer-entered return reason comments that occur in the subset of the customer-entered return reason comments at a frequency that is higher than a minimum, too-rare threshold and lower than a maximum, too-common threshold.

12. The method according to claim 11, wherein the minimum and maximum thresholds are non-zero values.

13. The method according to claim 11, wherein the n-gram lexicon is generated by processing n-grams in the subset of the customer comments in order from largest n-grams to smallest n-grams.

14. The method according to claim 13, wherein n is the range of integers from 1 to 4.

15. The method according to claim 7, wherein the customer-entered return data further includes customer-selected return reason codes, each customer-selected return reason code being associated with a respective customer-entered return reason comment.

16. A system for outputting an analysis of customer-entered returns data including customer-selected return reason codes and customer-entered return reason comments, the system comprising:

a communications interface communicatively connected to a seller computing device; a processing device; and one or more computer-readable media comprising computer-executable instructions that, when executed by the processing device, cause the system to:

output, to a user interface of the seller computing device via the communication interface, an indication of a respective estimated root cause for each of a plurality of returns, wherein the respective estimated root cause for each of the plurality of returns is based on respective customer comments for each of the plurality of returns;

output, to the user interface, indications of a probability and an associated uncertainty for the respective estimated root cause of each of the plurality of returns; and output, to the user interface, for each return of the plurality of returns, an indication of one or more n-grams in the respective comments of the return on which the respective estimated root cause of the return is based.

17. The system of claim 16, wherein the probability and the associated uncertainty for the respective estimated root cause of each of the plurality of returns is based on an application of a Bayesian network model to infer probability distributions based on a matrix of n-gram counts and extracted n-grams from the customer comments.

18. The system of claim 17, wherein applying the Bayesian network model comprises applying a Hamiltonian Monte Carlo (HMC) algorithm to the customer comments.

19. The system of claim 18, wherein the associated uncertainties for the estimated root causes of the plurality of returns comprise variances of Bayesian network parameter samples over prior iterations of the HMC algorithm.

20. The system of claim 16, wherein outputting the indications of the probability and associated uncertainty for the respective estimated root cause of each of the plurality of returns further includes outputting a graphical representation showing a percentage of the plurality of returns that are associated with at least one root cause, the at least one root cause being an estimated root cause for at least one return of the plurality of returns.

* * * * *